US011281888B2

(12) United States Patent
Srivastava et al.

(10) Patent No.: US 11,281,888 B2
(45) Date of Patent: Mar. 22, 2022

(54) SEPARATION OF OBJECTS IN IMAGES FROM THREE-DIMENSIONAL CAMERAS

(71) Applicant: Mashgin Inc., Palo Alto, CA (US)

(72) Inventors: Abhinai Srivastava, Palo Alto, CA (US); Mukul Dhankhar, Palo Alto, CA (US)

(73) Assignee: Mashgin Inc., Palo Alto, CA (US)

( * ) Notice: Subject to any disclaimer, the term of this patent is extended or adjusted under 35 U.S.C. 154(b) by 20 days.

(21) Appl. No.: 16/923,674

(22) Filed: Jul. 8, 2020

(65) Prior Publication Data

US 2020/0342208 A1 Oct. 29, 2020

Related U.S. Application Data

(63) Continuation of application No. 15/685,455, filed on Aug. 24, 2017, now Pat. No. 10,803,292, and a
(Continued)

(51) Int. Cl.
*G06K 9/00* (2006.01)
*G06T 17/10* (2006.01)
(Continued)

(52) U.S. Cl.
CPC ........ *G06K 9/00214* (2013.01); *G01B 11/245* (2013.01); *G06K 9/00671* (2013.01);
(Continued)

(58) Field of Classification Search
CPC . G06K 9/00993; G06K 9/346; G06K 9/00624
See application file for complete search history.

(56) References Cited

U.S. PATENT DOCUMENTS

| 6,295,367 B1 | 9/2001 | Crabtree et al. |
| 6,990,228 B1 | 1/2006 | Wiles et al. |

(Continued)

FOREIGN PATENT DOCUMENTS

| DE | 19536294 A1 | 4/1997 |
| DE | 102014111656 A1 | 2/2016 |

(Continued)

*Primary Examiner* — Ruiping Li
(74) *Attorney, Agent, or Firm* — Jeffrey Schox; Diana Lin

(57) ABSTRACT

Methods, systems, and programs are presented for simultaneous recognition of objects within a detection space utilizing three-dimensional (3D) cameras configured for capturing 3D images of the detection space. One system includes the 3D cameras, calibrated based on a pattern in a surface of the detection space, a memory, and a processor. The processor combines data of the 3D images to obtain pixel data and removes, from the pixel data, background pixels of the detection space to obtain object pixel data associated with objects in the detection space. Further, the processor creates a geometric model of the object pixel data, the geometric model including surface information of the objects in the detection space, generates one or more cuts in the geometric model to separate objects and obtain respective object geometric models, and performs object recognition to identify each object in the detection space based on the respective object geometric models.

20 Claims, 15 Drawing Sheets

Related U.S. Application Data continuation-in-part of application No. 15/497,730, filed on Apr. 26, 2017, now Pat. No. 10,467,454.

(51) Int. Cl.

| | | |
|---|---|---|
| *G01B 11/245* | (2006.01) | |
| *G06T 7/174* | (2017.01) | |
| *G06T 7/194* | (2017.01) | |
| *G06T 17/00* | (2006.01) | |
| *H04N 5/232* | (2006.01) | |
| *G06T 7/11* | (2017.01) | |
| *G06K 9/32* | (2006.01) | |

(52) U.S. Cl.
CPC .............. *G06T 7/11* (2017.01); *G06T 7/174* (2017.01); *G06T 7/194* (2017.01); *G06T 17/00* (2013.01); *G06T 17/10* (2013.01); *H04N 5/232* (2013.01); *G06K 2009/3225* (2013.01); *G06T 2200/04* (2013.01); *G06T 2200/08* (2013.01); *G06T 2207/10024* (2013.01); *G06T 2207/10028* (2013.01); *G06T 2207/20221* (2013.01)

(56) References Cited

U.S. PATENT DOCUMENTS

| | | | |
|---|---|---|---|
| 9,258,550 | B1 | 2/2016 | Sieracki et al. |
| 9,327,406 | B1 | 5/2016 | Hinterstoisser et al. |
| 2003/0080190 | A1 | 5/2003 | Tsikos et al. |
| 2005/0052535 | A1 | 3/2005 | Hamadi |
| 2005/0088529 | A1 | 4/2005 | Geng |
| 2005/0163382 | A1 | 7/2005 | Herley |
| 2005/0189411 | A1 | 9/2005 | Ostrowski et al. |
| 2006/0043174 | A1 | 3/2006 | Banavar et al. |
| 2006/0208169 | A1 | 9/2006 | Breed et al. |
| 2008/0252985 | A1 | 10/2008 | Zhu et al. |
| 2009/0059270 | A1 | 3/2009 | Opalach et al. |
| 2009/0268967 | A1 | 10/2009 | Simon et al. |
| 2010/0059589 | A1 | 3/2010 | Goncalves et al. |
| 2010/0166294 | A1 | 7/2010 | Marrion et al. |
| 2010/0217678 | A1 | 8/2010 | Goncalves |
| 2010/0232681 | A1 | 9/2010 | Fujieda et al. |
| 2013/0010081 | A1 | 1/2013 | Tenney et al. |
| 2013/0223673 | A1 | 8/2013 | Davis et al. |
| 2013/0314541 | A1 | 11/2013 | Lord et al. |
| 2014/0034731 | A1 | 2/2014 | Gao et al. |
| 2014/0036630 | A1 | 2/2014 | Herwig |
| 2015/0009214 | A1 | 1/2015 | Lee et al. |
| 2015/0023555 | A1 | 1/2015 | Okamura et al. |
| 2015/0066201 | A1 | 3/2015 | Wubbena et al. |
| 2015/0109451 | A1 | 4/2015 | Dhankhar |
| 2015/0310601 | A1 | 10/2015 | Rodriguez et al. |
| 2016/0063821 | A1 | 3/2016 | Macintosh et al. |
| 2016/0110913 | A1 | 4/2016 | Kosoy et al. |
| 2016/0269714 | A1 | 9/2016 | Rhemann et al. |
| 2016/0364634 | A1 * | 12/2016 | Davis .................. G06K 9/3275 |
| 2017/0054965 | A1 * | 2/2017 | Raab ........................ G06T 7/70 |
| 2017/0278308 | A1 | 9/2017 | Bleiweiss et al. |
| 2018/0103209 | A1 | 4/2018 | Fischler et al. |
| 2018/0314877 | A1 | 11/2018 | Srivastava et al. |

FOREIGN PATENT DOCUMENTS

| | | |
|---|---|---|
| JP | 2009042082 A | 2/2009 |
| JP | 2013186548 A | 9/2013 |
| WO | 2012128754 A1 | 9/2012 |
| WO | 2018200090 A1 | 11/2018 |

* cited by examiner ns in Images  
SEPARATION OF OBJECTS IN IMAGES FROM THREE-DIMENSIONAL CAMERAS

CLAIM OF PRIORITY

This application is a Continuation of U.S. patent application Ser. No. 15/685,455 filed 24 Aug. 2017, which is a Continuation-in-part Application of U.S. patent application Ser. No. 15/497,730, filed on Apr. 26, 2017, each of which is incorporated by reference in their entirety.

TECHNICAL FIELD

The subject matter disclosed herein generally relates to methods, systems, and programs for object recognition and, more particularly, methods, systems, and computer programs for object recognition using multiple cameras.

BACKGROUND

Visually recognizing objects is one of those tasks that is very simple for humans but very difficult for machines. Some solutions for visual recognition require that the object is in a very specific position, limit the number of objects that may be recognized, or require that a distinctive mark be placed on the object, such as multi-line barcodes or matrix barcodes.

But these solutions do not solve the general problem of quick recognition of any object from a large number of possible objects in an uncontrolled environment where the objects may be situated in any position, such as objects placed on a checkout counter.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
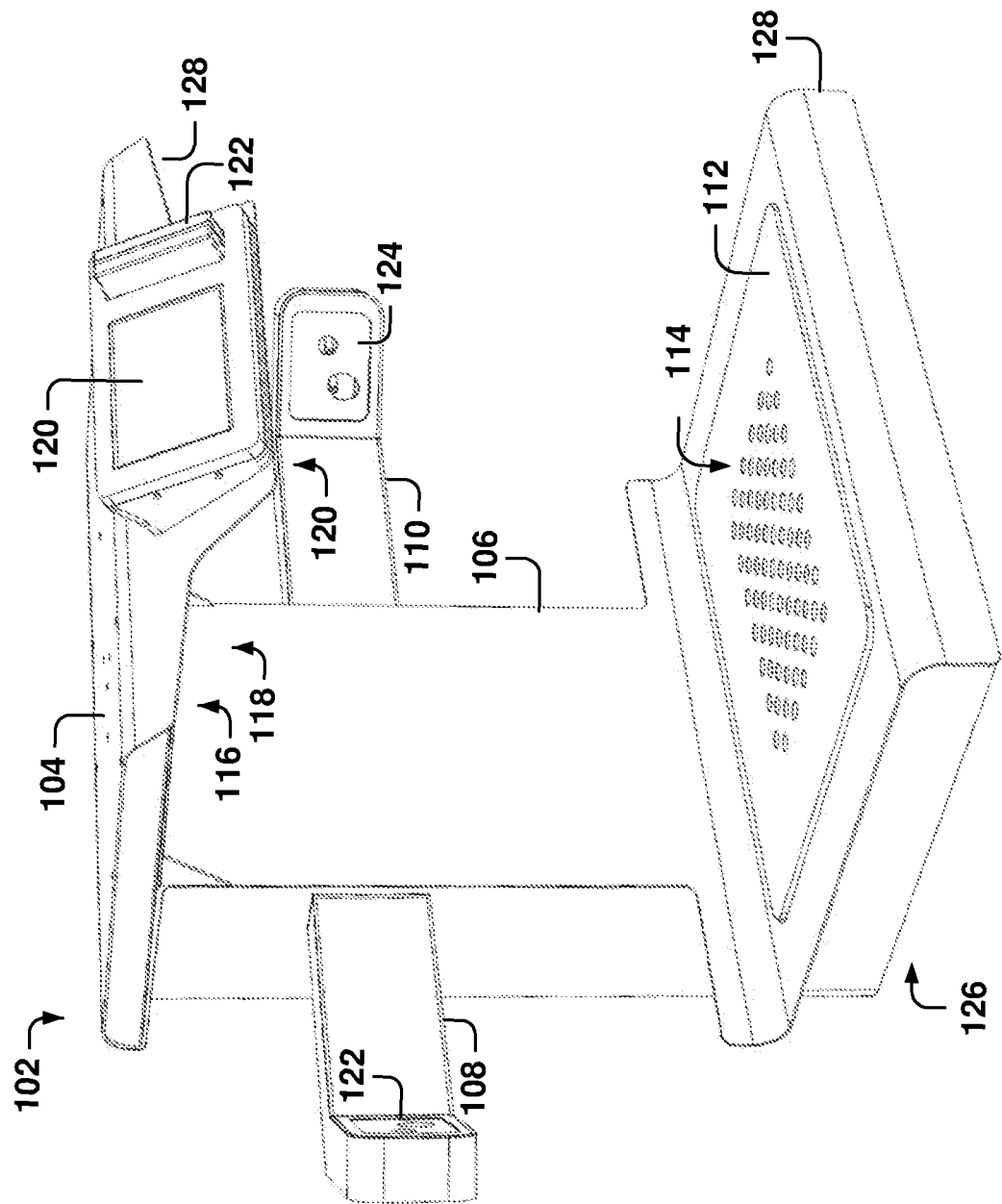
FIG. 1 illustrates an object recognition system, according to one example embodiment.

Example methods, systems, and computer programs are directed to simultaneous recognition of objects within an object-detection space utilizing three-dimensional (3D) cameras, according to some example embodiments. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Embodiments provide technical solutions for recognizing objects in a controlled environment where the objects may be situated in any position, such as objects placed on a checkout counter at the grocery store or at a cafeteria. In order to better recognize the objects, multiple three-dimensional (3D) cameras may be used to capture the object from different angles. This way, it is easier to identify the object, such as when a characteristic that uniquely defines the object may be situated in different positions (e.g., name of the brand of cereal or the name of a drink in an aluminum can).

Instead of trying to identify the object by examining the image from each camera separately, a model is created of the object by combining the image information from two or more 3D cameras. This way, the model includes more information about the object than the information obtained by any of the cameras alone. The use of 3D cameras allows the creation of a three-dimensional model of the object. Once the 3D model is created, the 3D model is used to identify the object utilizing a machine-learning algorithm.

In order to combine the image information from the plurality of cameras, the system is calibrated to be able to relate the information obtained from each camera to a common framework. In some example embodiments, a known pattern on a surface is used to correlate the positions and angles of the cameras to construct a common coordinate system. Since ambient conditions may change often (e.g., change of illumination, slight movement of the camera, etc.), the system continuously recalibrates the cameras to avoid losing information synchronicity.

When objects are in contact with each other, separation of the object data is performed in order to do image recognition on each object individually. When the objects are not in contact with each other, separation is straightforward because there is space between the different objects. However, when the objects are in contact (e.g., "touching"), then separation is performed by creating a geometric model of the objects and then creating one or more cuts on the object data to separate the objects.

One general aspect includes a method including an operation for calibrating a plurality of 3D cameras based on a pattern in a surface. The method also includes capturing 3D images for recognizing objects when present in an object-detection space, combining data of the captured 3D images to obtain pixel data of the object-detection space, and removing, from the pixel data, background pixels of a background in the object-detection space to obtain object pixel data associated with the objects in the object-detection space. The method further includes operations for creating a geometric model of the object pixel data, the geometric model including surface information of the objects in the object-detection space, and for generating one or more cuts in the geometric model to separate objects and obtain respective object geometric models. The method also includes performing object recognition to identify each object in the object-detection space based on the respective object geometric models.

One general aspect includes a system including a plurality of 3D cameras, a memory including instructions, and one or more computer processors. The 3D cameras are configured for capturing 3D images for recognizing objects when present in an object-detection space and the 3D cameras are calibrated based on a pattern in a surface. The instructions, when executed by the one or more computer processors, cause the one or more computer processors to perform operations including: combining data of the captured 3D images to obtain pixel data of the object-detection space; removing, from the pixel data, background pixels of a background in the object-detection space to obtain object pixel data associated with the objects in the object-detection space; creating a geometric model of the object pixel data, the geometric model including surface information of the objects in the object-detection space; generating one or more cuts in the geometric model to separate objects and obtain respective object geometric models; and performing object recognition to identify each object in the object-detection space based on the respective object geometric models.

One general aspect includes a non-transitory machine-readable storage medium including instructions that, when executed by a machine, cause the machine to perform operations including: calibrating a plurality of 3D cameras based on a pattern in a surface; capturing, by the plurality of 3D cameras, 3D images for recognizing objects when present in an object-detection space; combining data of the captured 3D images to obtain pixel data of the object-detection space; removing, from the pixel data, background pixels of a background in the object-detection space to obtain object pixel data associated with the objects in the object-detection space; creating a geometric model of the object pixel data, the geometric model including surface information of the objects in the object-detection space; generating one or more cuts in the geometric model to separate objects and obtain respective object geometric models; and performing object recognition to identify each object in the object-detection space based on the respective object geometric models.

FIG. 1 illustrates an object recognition system 102, according to one example embodiment. Some embodiments are disclosed in the context of an automated object recognition for a checkout system, e.g., in a cafeteria or a grocery counter, but the principles for object recognition may be utilized in other scenarios that may benefit from visually recognizing objects. Examples of such scenarios may include, but are not limited to, self-checkout of products by customers in supermarkets, restaurants, or coffee shops, multi-product packaging of diversified products in a packaging plant, product quality control in a manufacturing plant, advanced driver assistance systems such as automatic parking systems, public surveillance systems, and automated teller machines (ATMs).

The object recognition system 102 may include a base 128, a post section 106 on one side of the base 128, and a top section 104 above the post section 106. On the base 128, a tray 112 is used for supporting objects during the object recognition operations, and a scale 126 under the tray 112 may be used for weighing items. A first wingspan section 108 and a second wingspan section 110 are connected to the post section 106 and extend outwards to hold 3D cameras 122 and 124 and provide additional viewing angles for the objects on the tray 112, which is helpful for capturing details on the sides of the objects placed on tray 112.

Additional 3D cameras 116, 118, and 120 are positioned on the bottom surface of the top section 104. In some example embodiments, camera 116 and camera 118 are of different types and although they may be situated near each other, they provide different visual information based on the 3D technology utilized. Camera 120 is positioned towards the front of the top section 104, underneath the display 130, which is used to present user interfaces, such as user interfaces for configuring the object recognition system 102 or for presenting messages to users on the checkout counter.

The object recognition system 102 further includes a card reader 132 for receiving credit card information. Although a stripe card reader is illustrated, the card reader may also collect credit card information in other ways, such as a credit card chip reader or an interface to obtain payment information from a smart phone.

An illumination device 130 (e.g., compact fluorescent tubes, bulbs, light emitting diodes, etc.) may be configured to substantially illuminate the objects for recognition. A pattern 114 defined on the tray 112 is utilized for calibrating the cameras used for object recognition. The calibration pattern 114 may include various colors such as red, green, blue, white, black and their shades or combinations, and the calibration pattern 114 may be in any shape such as squares, color wheel or any other kind of shape into the base 128.

It is noted that the embodiments illustrated in FIG. 1 are examples and do not describe every possible embodiment. Other embodiments may have different shapes, place cameras in different positions, place illumination sources in different positions, and so forth. The embodiments illustrated in FIG. 1 should therefore not be interpreted to be exclusive or limiting, but rather illustrative.

Figure 2:
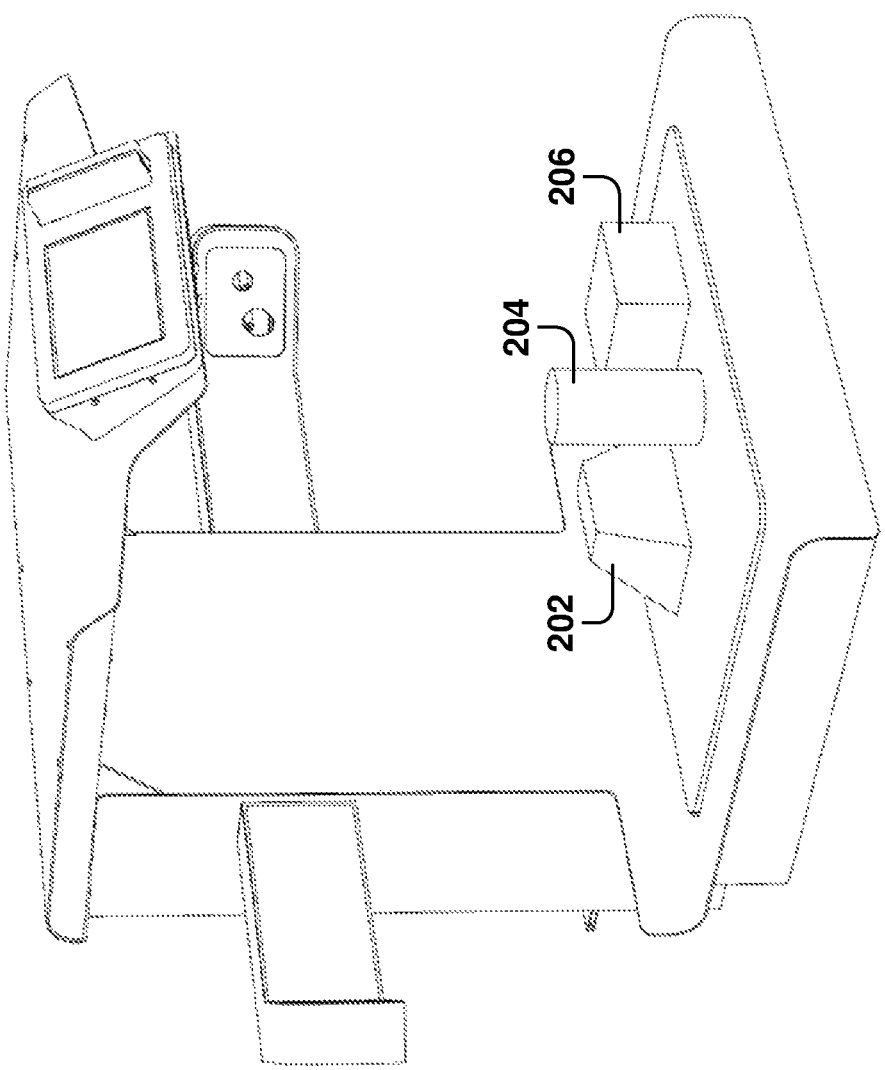
FIG. 2 illustrates the placement of objects for recognition, according to some example embodiments.

FIG. 2 illustrates the placement of objects for recognition, according to some example embodiments. During object recognition, objects are placed on the tray 112, such as the illustrated objects 202, 204, and 206, and the object recognition system 102 takes 3D images of the objects on the tray.

More than one object at a time may be recognized, and if more than one object is present, the object recognition system 102 creates separate 3D models for each of the objects before they are submitted to an object recognition program. Further, the objects do not have to be placed on a predetermined location of the tray 112, with a predetermined orientation (e.g., standing on the side or standing on the base), or with a bar code aiming in a certain direction. The system does not rely on barcodes to recognize the objects, but rather the system analyzes the shape, color, and dimensions of the object to determine its identity, although if a barcode is detected, the barcode may also be used for recognition.

Figure 3:
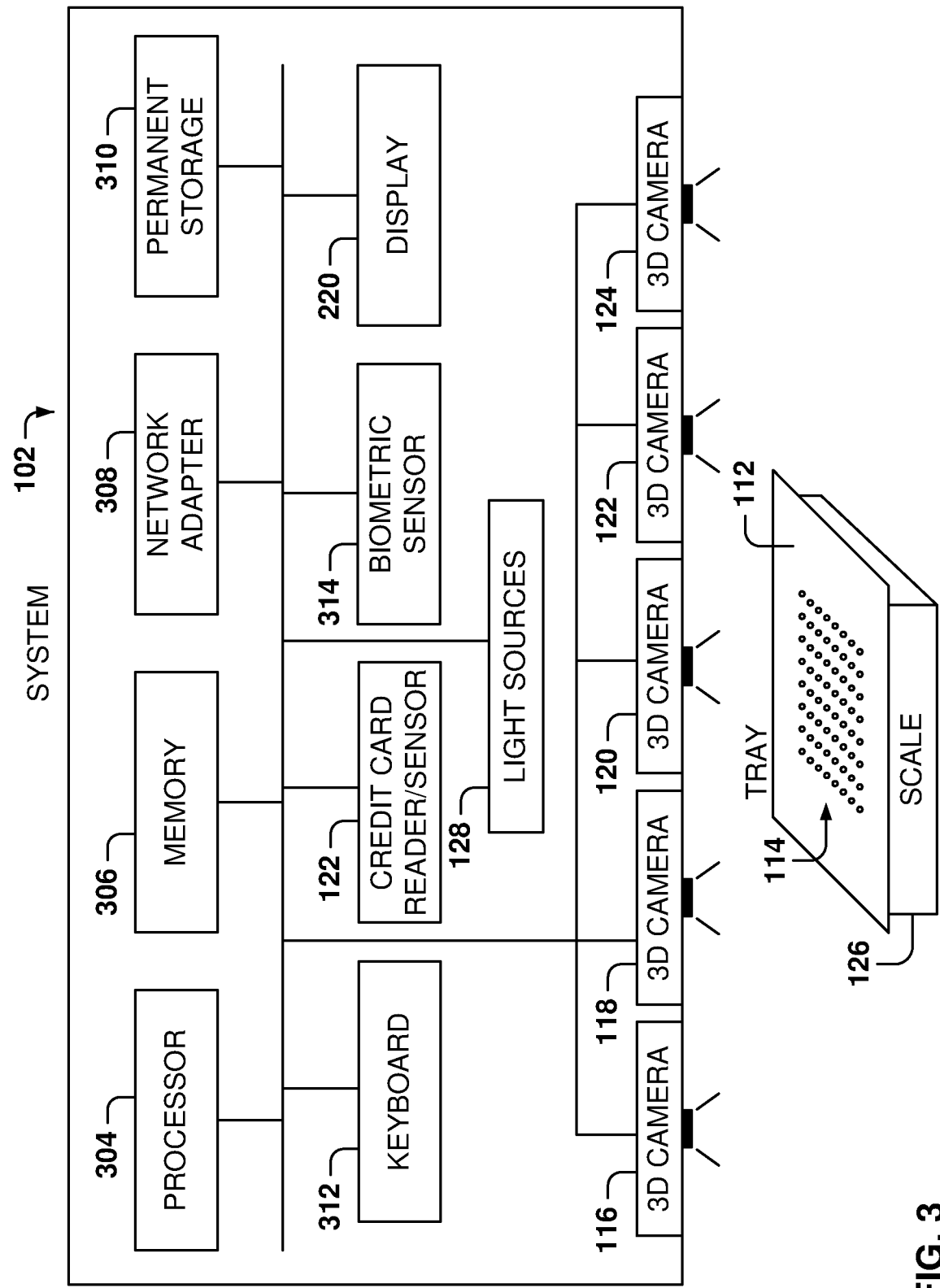
FIG. 3 illustrates the components of the system for object recognition, according to an example embodiment.

FIG. 3 illustrates the components of the object recognition system 102, according to an example embodiment. In some example embodiments, the object recognition system 102 includes a processor 304 for executing computer instructions of the programs described herein, a memory 306 for storing digital data (e.g., image capture data), a network adapter 308, and permanent storage 310. The network adapter 308 provides wired or wireless communications to connect the object recognition system 102 to a network (e.g., the Internet) or to other devices, such as user smart phones, tablets, and the like. The network adapter 308 may support standard Internet protocols (e.g., TCP/IP, UDP, 802.x) and other protocols for local communications, such as Bluetooth®, Wi-Fi®, infrared or ultrasonic devices, credit card protocols, Body Area Network, and so forth. The permanent storage 310 may store computer programs or computer data, such as 3D object models and system configuration parameters.

The object recognition system 102 further includes a keyboard 312, a credit card reader/sensor 122, one or more biometric sensors 314, one or more displays 220, and one or more light sources 134. The keyboard 312 may be used to enter data, such as configuration data or item descriptions. The credit card reader/sensor 122 is used for reading credit card information, which may be transmitted to a remote location via network adapter 308. The biometric sensor 314 is used to capture user information, such as a fingerprint or a retina scan. One or more displays 220 are used to present information, such as item name, item description, item price, item weight, total due, and the like. The one or more light sources 134 may be distributed across a certain volume in order to provide adequate illumination to objects placed in the volume of interest for recognizing the objects (e.g., over tray 112).

The object recognition system 102 further includes a plurality of 3D cameras 116, 118, 120, 122, and 124, the tray 112, and a scale 126 for weighing items placed on the tray 112. The 3D cameras may be of different types, such as a stereo camera, a structured light camera, a range camera, and so forth. Different types of cameras may be used simultaneously because the calibration process enables transforming the data from all of the cameras into a compatible format to build 3D object models.

In general, each type of 3D camera has strengths and weaknesses. By combining at least two of the different types of 3D cameras, it is possible to leverage their respective strengths. In some example embodiments, four stereo cameras and one structured-light 3D camera are utilized, as illustrated in the example of FIG. 1, but other embodiments may utilize other camera combinations.

A stereo camera is a type of camera with two or more lenses with a separate image sensor or film frame for each lens. This allows the camera to simulate human binocular vision, and therefore gives it the ability to capture 3D images, a process known as stereo photography. Structured-light 3D cameras, also referred to as a structured-light 3D scanners, project a pattern of light on the subject and measure the deformation of the pattern on the subject. The pattern is projected onto the subject using either a projector or other stable light source. The camera, offset slightly from the pattern projector, looks at the shape of the pattern and calculates the distance of every point in the field of view.

One of the advantages of 3D cameras is their speed. Instead of scanning one point at a time, structured light scanners scan multiple points or the entire field of view at once. Scanning an entire field of view in a fraction of a second reduces or eliminates the problem of distortion from motion.

In some example embodiments, other types of cameras may also be used, such as infrared cameras, depth cameras, ultraviolet cameras, regular two-dimensional (2D) cameras, and the like. Information provided by each camera is combined with the information provided by the other cameras, although some cameras may only provide depth information or color information.

In some example embodiments, the tray 112 includes a pattern 114 used for calibrating the 3D cameras. In some example embodiments, the pattern includes a plurality of circles arranged on a grid pattern. However, other embodiments may utilized other patterns, as long as the pattern is known by the object recognition system 102. For example, the pattern may include one or more rectangles, a photograph, one or more triangles, combinations of different shapes, such as rectangles circles, triangles, and so forth.

It is noted that the pattern does not have to be visible during object recognition, because the pattern is needed for the calibration phase. For example, a user may place a cafeteria tray on the tray 112 and the object recognition system 102 will proceed to identify the objects on the tray 112, such as a bottle, a can, a bag of chips, a plate with a salad, and so forth. In some example embodiments, once the objects are recognized, the system may calculate a total bill based on the respective prices of the identified objects. Further, the system may ask the user to place a salad plate separately on the tray 112 in order to weigh a salad that is charged by weight.

It is noted that the embodiments illustrated in FIG. 3 are examples and do not describe every possible embodiment. Other embodiments may utilize fewer components or additional components. The embodiments illustrated in FIG. 3 should therefore not be interpreted to be exclusive or limiting, but rather illustrative.

Figure 4:
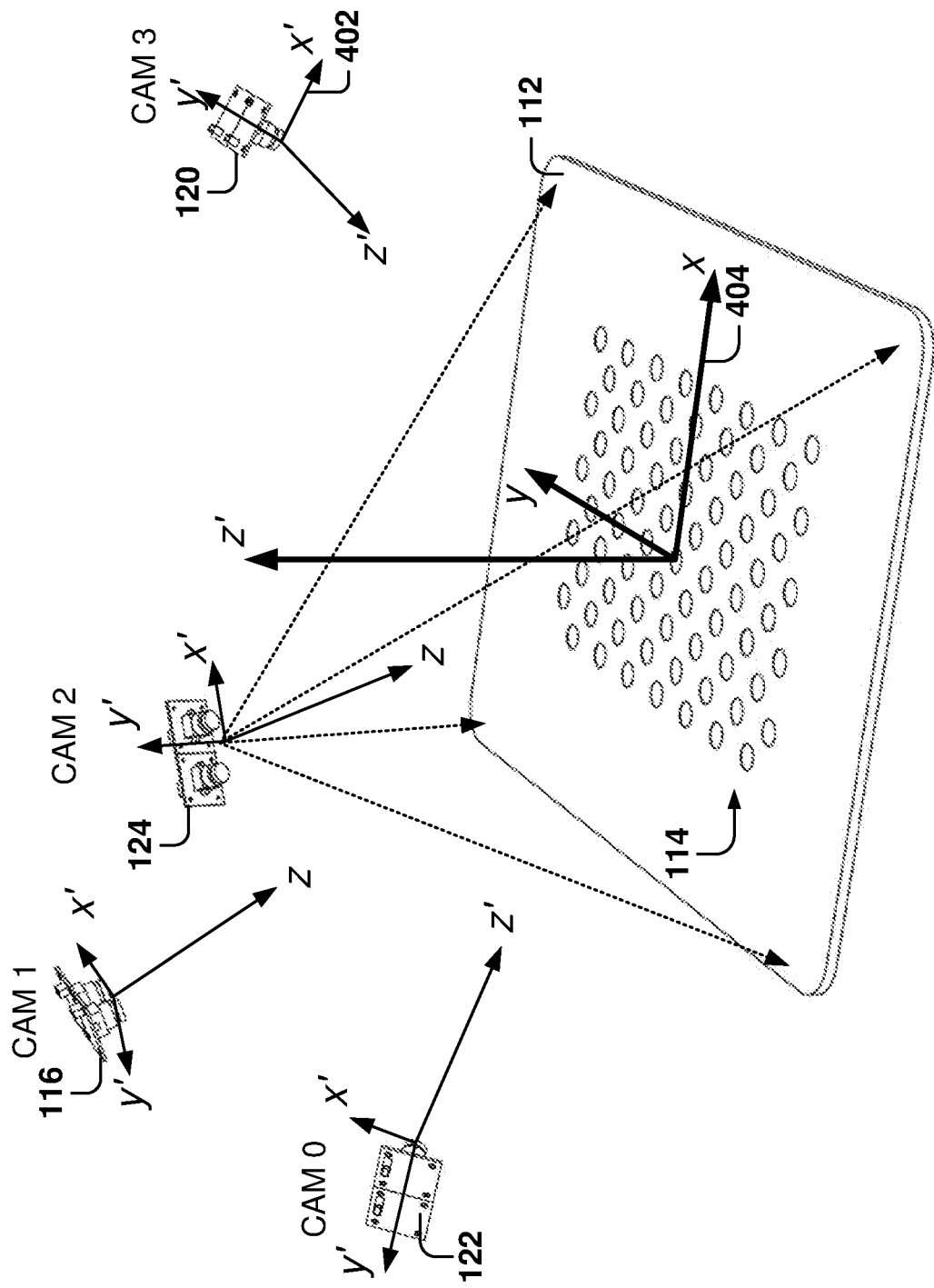
FIG. 4 illustrates the relationship between the common coordinate system and the multiple camera coordinate systems, according to an example embodiment.

FIG. 4 illustrates the relationship between the common coordinate system and the multiple camera coordinate systems, according to an example embodiment. Embodiments provide the ability to use multiple 3D cameras and the cameras may be of different types. Because of the calibration procedure described below, it is possible to combine the information from the multiple cameras (e.g., 116, 120, 122, and 124), even if the cameras are of different types.

In order to map all of the information from the multiple cameras to the same 3D space, a pattern 114 is used for calibrating image data captured by each of the cameras 128. The pattern allows the system to determine the location of each camera with reference to a common coordinate system 404.

The common coordinate system 404 is a Cartesian coordinate system used as a reference by the system. Object recognition involves translating all of the image capture data to be referenced against the common coordinate system. The common coordinate system 404 includes an origin on the surface of the tray 112, x and y axes perpendicular to each other on the surface of the tray 112, and a z axis perpendicular to the surface of the tray 112. Although embodiments presented herein are described with reference to a Cartesian coordinate system, any other coordinate system may be utilized using the principles described herein, such as a polar coordinate system, a spherical coordinate system, a cylindrical coordinate system, and so forth.

Each camera 128 includes its own camera coordinate system 402 where the z axis is a vector pointing out in the direction that the camera is taking images, and the x and y axes are on a plane perpendicular to the z axis. When each camera takes an image, the image data includes information for each of the captured pixels, which includes color data (e.g., red (R), green (G), and blue (B) data) and location data (e.g., x, y, x coordinates in the camera coordinate system).

However, the data from each camera cannot be directly combined because the location data is from different camera coordinate systems. The solution is to convert all data to the same common coordinate system 404 and then combine the image data obtained from all of the cameras.

It is noted that almost any image on the surface of the tray 112 may be used as a pattern. The use of a large number of circles that are disposed on a grid is a good pattern because it is relatively easy to identify the location of the circles and also because the disposition of the circles on a grid allows for performing error recovery on image data.

Therefore, each camera takes an image of the tray 112 at about the same time and the image data is analyzed to find the grid. In this example embodiment, the origin for the common coordinate system is centered on the grid, but the origin may be located anywhere else, as long as all cameras use the same origin and axes. In one example embodiment, the grid on the tray determines the x and y axes that are aligned with the parallel lines that outline the periphery of the grid.

Because the cameras are 3D cameras, each point of the image has depth information, and when the pattern circles are found, the system has the distance of the circles to each camera. In some example embodiments, error correction is performed on the image data. 3D data captured by cameras sometimes contains errors, such as depth information for some pixels. The position of the circles on the tray is known, and the fact that the circles are on the same plane may be used to perform error correction to make all of the points on the tray, including the points from the pattern, be in the same plane. Further, to make sure that the circles have distances from each other that match the grid, error correction may be performed by using regression tools for a best fit of the data into points that are on the same plane and according to the pattern, such as by using averages or other regression methods.

After the error correction is performed, if necessary, the image data is transformed from being described with reference to the camera coordinate system 402 to being described with reference to the common coordinate system 404, an operation referred to as a coordinate change. This means that for each pixel, the x', y', and z' coordinates from the camera coordinate system are transformed to x, y, and z values for the common coordinate system 404.

As used herein, a 3D pixel represents a point or a polygon (e.g., a square) in space with a color value and a location value. In addition, the 3D pixels may also be represented as a voxel, which includes a value on a regular grid in a 3D space. In some example embodiments, points and polygons are often explicitly represented by the coordinates of their vertices. In general, polygons are able to efficiently represent simple 3D structures with lots of empty or homogeneously filled space, while voxels are good at representing regularly sampled spaces that are non-homogeneously filled.

In some example embodiments, the coordinate transformation includes performing a rotation and a translation. In some example embodiments, a scale operation might have to be performed if the cameras utilize different units, but if the cameras utilize the same units (e.g., millimeters), then scaling is not performed.

After the image data from all of the cameras goes through the coordinate change, all of the image data is referenced against the same common coordinate system. The image data may then be merged to perform object recognition and create 3D models of objects based on the combination of views of the object from the different cameras. More details on object recognition are provided below with reference to FIGS. 6 and 7.

Further, it is noted that the embodiments are described with reference to a confined space for identifying objects, such as a small, typical checkout counter for grocery or cafeteria items. However, the same principles may be applied to larger spaces, such as a room, a showroom, a street, a building, a stadium, cars on a road, and so forth, as long as a known-pattern may be identified for calibrating the cameras. Further, the pattern does not have to be disposed on a flat surface and the pattern may have a 3D aspect, or there could be multiple patterns spread out through an identified volume (e.g., different patterns on several walls of the room). Further yet, not all cameras need to have sight of the whole area of interest and some cameras may visualize only part of the area of interest. For example, a network of cameras may be used to recognize objects throughout a house or to recognize people walking through the hallways of a building.

Even if multiple types of cameras are being used, it is possible to combine all of the 3D pixel information from all of the cameras when the 3D cameras use a common reference coordinate system. It is possible to combine data from the multiple 3D cameras by utilizing the calibrating pattern and periodic calibrations.

It is noted that the embodiments illustrated in FIG. 4 are examples and do not describe every possible embodiment. Other embodiments may utilize a different number of cameras (e.g., 2, 5, or more), have the cameras placed in different positions with reference to the pattern, use mirrors to obtain more angles on the object, and so forth. In some embodiments, the pattern may have a different grid, (e.g., a triangle, an irregular trapezoid, etc.). The embodiments illustrated in FIG. 4 should therefore not be interpreted to be exclusive or limiting, but rather illustrative.

Figure 5:
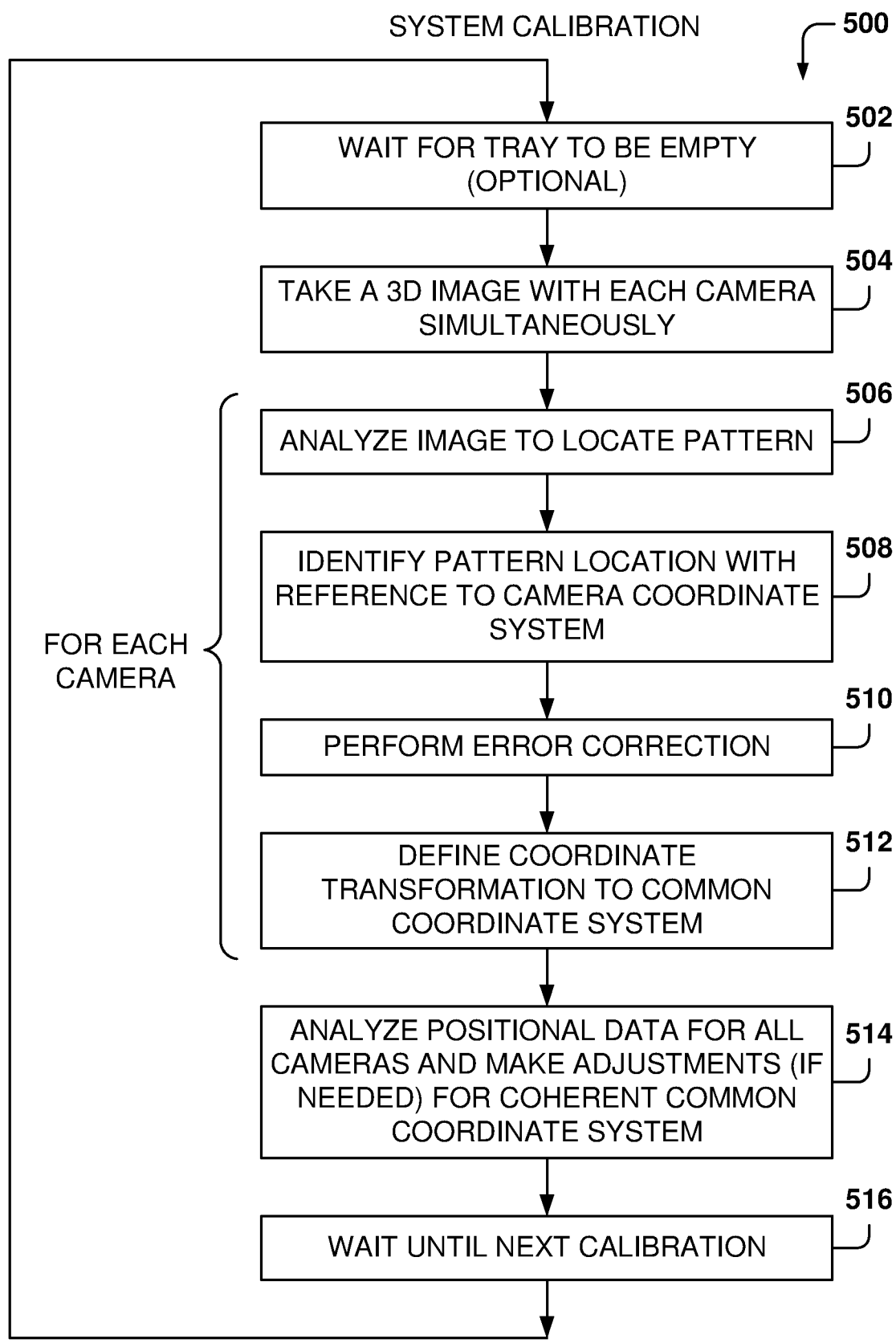
FIG. 5 is a flowchart of a method for calibrating the object-recognition system, according to some example embodiments.

FIG. 5 is a flowchart of a method 500 for calibrating the object-recognition system, according to some example embodiments. While the various operations in this flowchart are presented and described sequentially, one of ordinary skill will appreciate that some or all of the operations may be executed in a different order, be combined or omitted, or be executed in parallel.

At operation 502, the system waits for the tray to be empty before starting the calibration process. This way, the whole pattern is visible to the cameras. In other embodiments, the calibration process takes place even when there is an object on the tray, and only the visible part of the pattern is utilized for calibration.

From operation 502, the method flows to operation 504 where a 3D image is taken by each of the cameras simultaneously. The cameras take the picture at about the same time, although it may not be exactly concurrent, but the picture will be taken within a predetermined time interval, such as a tenth of a second, but other time intervals are also possible, such as in the range from one millisecond to two seconds.

For each camera, operations 506, 508, 510, and 512 are performed. At operation 506, the image data from the 3D image taken by the camera is analyzed to identify the location of the pattern in the image data. From operation 506, the method flows to operation 508 where the pattern location is identified with reference to the camera coordinate system.

At operation 510, error correction is performed, if necessary. As described above, error correction may take place if the image data for the location of the pattern does not exactly fall within the same plane in the pattern or if any of the image data is not as expected and known from the real world.

At operation 512, a coordinate transformation function is defined for the camera in order to convert image data of images taken by the camera to the common coordinate system.

At operation 514, the positional data for all of the cameras is analyzed and adjustments are made (if needed) to define a coherent common coordinate system with valid coordinate transformation functions for all of the cameras, such that when image data is combined, the image data referring to a particular pixel would be consistent among all of the cameras.

From operation 514, the method flows to operation 516 where the system waits for a predetermined amount of time until the next calibration is performed. It is noted that in the real world, the camera position may suffer slight adjustments over time, such as by contraction or expansion due to temperature changes or movement of the system because of the interaction of users with the system (e.g., by running a card through the card reader or pressing keys on a keyboard). This is why it is important to perform continuous calibration so the image data stays cohesive over time and object recognition is not impaired. Continuous calibration allows the camera system to always be synchronized and to create 3D models for objects being recognized.

Figure 6:
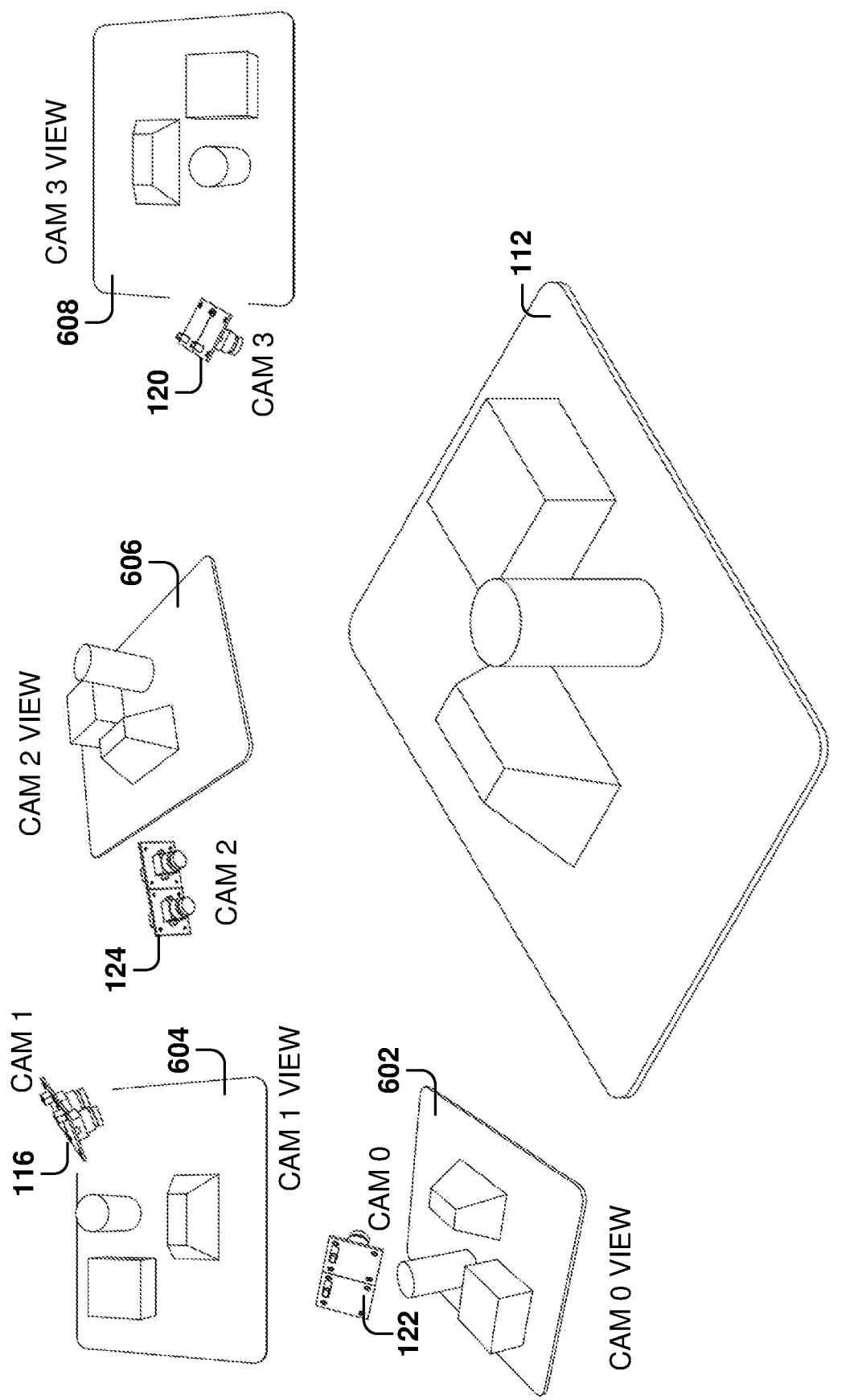
FIG. 6 illustrates how an object is recognized based on the different views of the object, according to some example embodiments.

FIG. 6 illustrates how an object is recognized based on the different views of the object, according to some example embodiments. In this example embodiment, three objects 202, 204, and 206 are placed on the tray 112 for recognition by four cameras 116, 120, 122, 124. The system separates the objects before attempting to recognize what each object is.

For people, it is very easy to visually separate the objects and identify what part of the volume each object occupies. However, this is a difficult task for a computer. After taking 3D images of the space over the tray 112, the computer has a collection of pixels having a color (e.g., red, green, blue (RGB) values) and a location (x, y, z values). Since objects may have multiple colors, separating them by their color is not a straightforward proposition, especially when the objects are touching. If the objects are not touching, a first approach to separation is to identify an object as a collection of pixels that are not in contact with another collection of pixels. However, this approach is not possible when the objects are touching or when an object is in the way of the other object.

Having 3D image information allows the system to separate the objects because the system has not only the color information but also the location information. Knowing the location helps because the surfaces of an object have points that are next to each other so it is easier to identify surfaces on the object. On the other hand, if only color information is examined, it is not straightforward to determine if a given pixel belongs to an object near the camera or the pixel belongs to an object that is further away from the camera.

Once the system separates the objects 202, 204, and 206, each item is evaluated separately to determine its identity. For simplicity of description purposes, object recognition is described with reference to four cameras, but the same principles may be used when there is a different number of cameras.

Each of the cameras has a different view of the objects. As shown, camera 116 provides a view 604 of the objects, camera 124 provides view 606, camera 120 provides view 608, and camera 122 provides view 602. Views 604 and 608 provide a top perspective of the objects, while views 602 and 606 provide lateral views of the objects.

Because each camera has a coordinate transformation function to convert data into the common coordinate system, the image data captured for all of the cameras can be combined to generate respective 3D models of the objects 202, 204, and 206. Combining the data for each object into a single model facilitates object recognition. For example, the name of the product may not be completely visible to any camera, but the combination model may be able to "see" the complete name of the product in the 3D model.

If there is a point that is visible from two cameras, when combining the information from both cameras, that point will have the same location information from both cameras because of the common coordinate system. In addition, the color information may vary slightly due to the different information provided by each camera, but the color information should be similar and a representative color will be selected for the combination.

Combining the image data includes combining pixel data for each of the pixels obtained from each of the cameras and also includes identifying characteristics of the object, such as surfaces, lines separating two surfaces, and so forth. By identifying the surfaces (e.g., planes), the combination will include the surfaces of the object. In some example embodiments, the surfaces are defined by polygons that include all of the points of the surface, but other embodiments may use different representations.

Additionally, it is possible to perform validation on the different pixels by identifying how the pixels fit within each of the identified surfaces or characteristics of the object. It provides a consistency test by making sure that the pixels on the surface of the object provide continuous surfaces, as real-life objects do. Further, matching the surfaces and pixels identified by multiple cameras confirms that the cameras are properly aligned.

If the calibration is correct, a point observed by one camera would have the same color and location as the same point observed by the other cameras. The RGB values may vary slightly because of variability of each camera and the lighting environment. The resulting RGB used for the combination may be calculated based on the values from the different cameras for that pixel (e.g., by calculating the average) and based on the RGB values of the surrounding pixels in order to provide color consistency in surfaces with uniform coloring.

Separating surfaces is easier with 3D data. For example, if there is a first flower in a first plane in front of a second flower in a further plane (e.g., 5 meters behind), where the first flower covers some of the second flower from the camera, it is difficult for the computer to separate the flowers with only 2D information. However, with 3D information, namely the location of the pixels, it is much easier to separate the data of the first flower from the data of the second flower because the computer knows the respective location of the corresponding pixels.

Similarly, it is easier to separate objects on the tray 112 when location information is available, even if the two objects are touching or one is in front of the other. The additional location information clarifies that one object is further from the other, so separating the objects is easier than without having location information.

After combining the information, the system has a 3D model of the object, including all of the visible points from any camera, including their location, and all with reference to the common coordinate system.

Figure 7:
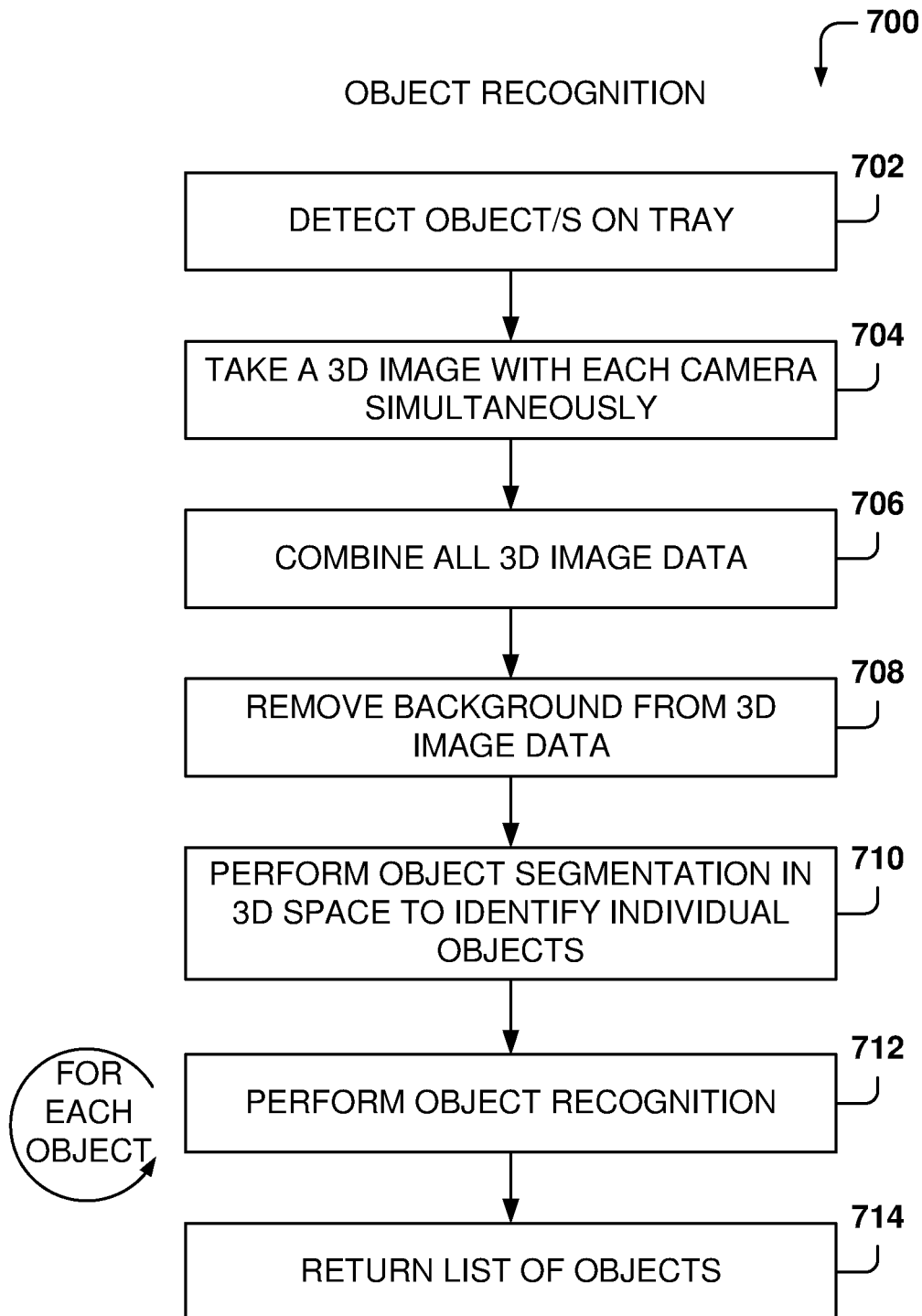
FIG. 7 is a flowchart of a method for recognizing an object, according to some example embodiments.

FIG. 7 is if flowchart of a method 700 for recognizing an object, according to some example embodiments. While the various operations in this flowchart are presented and described sequentially, one of ordinary skill will appreciate that some or all of the operations may be executed in a different order, be combined or omitted, or be executed in parallel.

At operation 702, one or more objects are detected on the tray. In some example embodiments, the object is detected by a proximity sensor, a light sensor, by taking periodic pictures of the tray and examining their content, or by some other type of sensor.

At operation 704, a 3D image is taken by each of the cameras at about the same time. The cameras may take the same picture simultaneously, or within a predetermined period of time, such as a period of time in the range of one millisecond to two seconds or more.

From operation 704, the method flows to operation 706 were all of the 3D image data captured in operation 704 is combined to obtain a combined 3D image data, which is a single 3D model of the view for the cameras. The previously-performed calibration facilitates combining the data because the data has the common coordinate system as a reference.

From operation 706, the method flows to operation 708, where the background is removed from the 3D image data. At operation 710, object segmentation is performed in the 3D space to identify the individual objects present in the 3D image data. The result of the object segmentation is the separation of the multiple objects (if there is more than one object), where each object has its own 3D model. It is noted that combining the 3D image data for each object includes, in some example embodiments, identifying the surfaces of the object and ensuring that the surfaces are joined together to obtain the model for the 3D object. Separating the objects makes object recognition easier because the computer system does not have to account for extraneous data that does not belong to a particular object.

From operation 710, the method flows to operation 712, where for each object, object recognition is perform based on the 3D image data for the object. In some example embodiments, object recognition is performed by a machine learning algorithm that has been trained with 3D models of a plurality of objects. The 3D model includes all of the known information for the object, including all of the sites that are visible to any of the cameras. Each point includes color as well as location information, which facilitates the object recognition by the machine-learning program.

Performing object recognition in 3D is more accurate than object recognition in 2D in environments where the objects may be positioned differently with reference to the camera. For example, in a semiconductor test environment where a semiconductor chip is always presented in the same position, and at the same distance, from a camera, the 2D object recognition or testing, may be effective. However, in a situation where objects may be in different positions, such as in a grocery checkout stand, 2D object recognition is much more complicated because the system has to be able to recognize the object from any angle, which requires data for one particular object in many different positions. This grows geometrically the number of alternatives for recognizing objects.

When performing object recognition in 3D, there is only one model for the 3D object, so finding the identity of the object requires matching one object in the database, and not one of many 2D views possible for the object.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data in order to make data-driven predictions or decisions expressed as outputs or assessments.

In some example embodiments, different machine-learning tools may be used. For example, Logistic Regression (LR), Naive-Bayes, Random Forest (RF), neural networks (NN), matrix factorization, and Support Vector Machines (SVM) tools may be used for object identification, but other machine-learning tools may also be utilized.

In general, there are two types of problems in machine learning: classification problems and regression problems. Classification problems aim at classifying items into one of several categories (for example, is this object an apple or an orange?). Regression algorithms aim at quantifying some items (for example, by providing a value that is a real number). In some example embodiments, the machine-learning algorithm provides the identity of the object on the tray. In another example embodiment, the machine-learning algorithm provides a ranking score (e.g., a number from 1 to 100) to provide a probability that the object matches one or more of the objects in the database of objects. The machine-learning algorithms utilize training data to find correlations among identified features that affect the outcome. The features may include shape, size, longest dimension, shortest dimension, typical orientation (e.g., a salad on a plate is mostly flat when compared to a bottle of beer that is mostly vertical), color or colors, light reflectivity, frequency of purchases by users, and so forth.

Training data is used to train the machine-learning algorithm, and the training data may include a plurality of views of objects and an entry indicating the identity of the object. The machine-learning tool appraises the value of the features as they correlate to the training data, and the result of the training is a trained machine-learning program, which may be used for object identification. At operation 714, the object-recognition program returns a list of one more objects identified on the tray.

Figure 8:
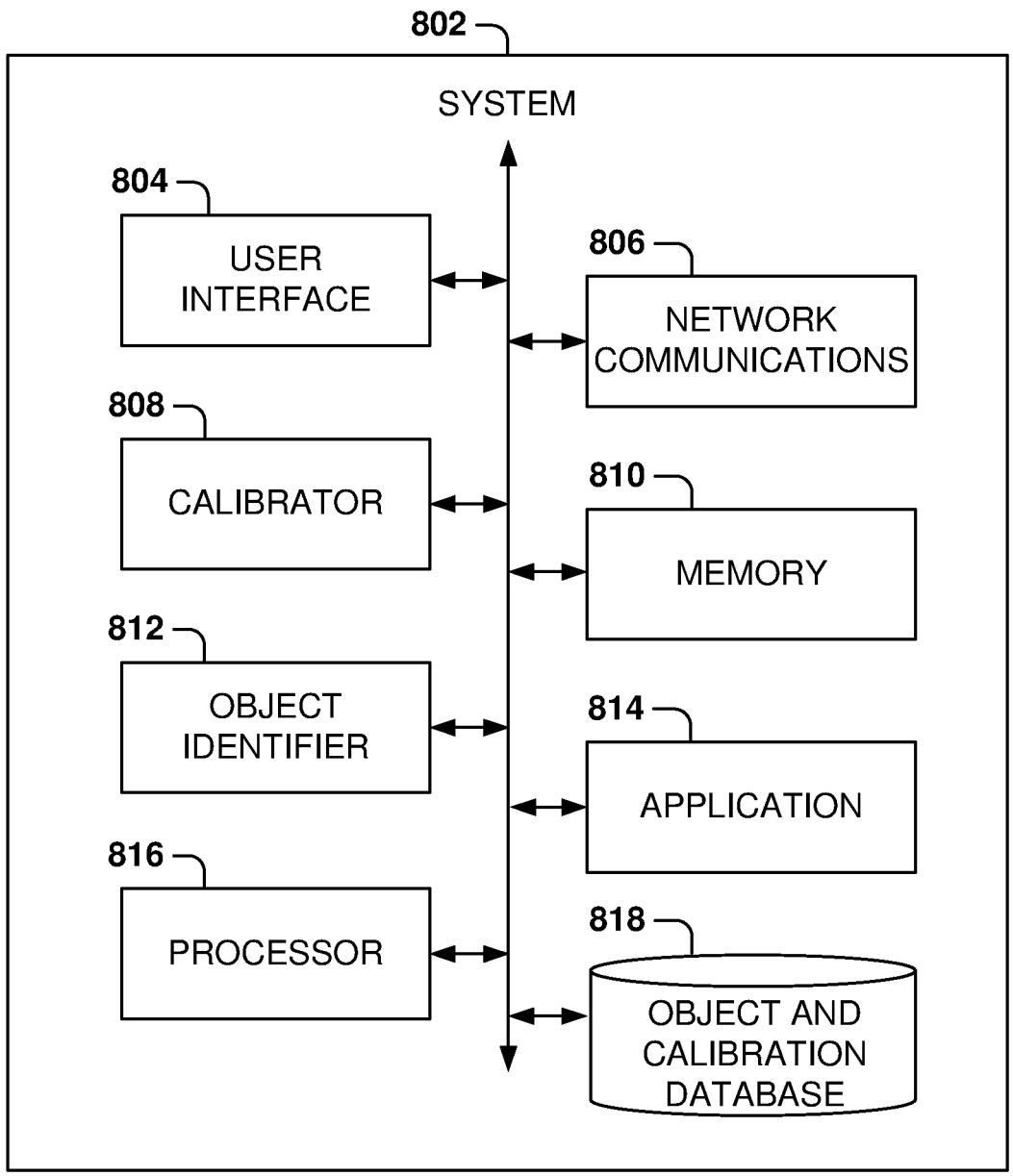
FIG. 8 illustrates some of the system components, according to some example embodiments.

FIG. 8 illustrates some of the system components, according to some example embodiments. In some example embodiments, system 802 includes a user interface 804, a calibrator 808, an object identifier 812, a processor 816, network communications 806, a memory 810, one or more applications 814, and an object and calibration database 818.

The user interface 804 creates the user interface data for presenting the user interface at a display, a client device, or a server. For example, the user interface 804 may include a user interface for configuring the object recognition system, for entering system data, for presenting identification of objects, for presenting a bill to a user, for communicating a message to the user (e.g., place the salad plate on the tray by itself for weighing), and so forth.

Network communications 806 provide communications to other devices, such as communication with the server, or another client, or a smart phone or the user, and so forth. The calibrator 808 is used to perform calibration of the object recognition system, such as the calibration illustrated with reference to FIGS. 4 and 5.

The object identifier 812 performs object recognition on the objects placed on the tray, such as the example described above with reference to FIGS. 6 and 7. In some example embodiments, the object recognition is performed by a machine-learning program, but other types of object recognition may be utilized based on the 3D data capture for each of the objects.

The memory 810 contains program instructions for the different programs and also may be used by processor 816 during operation to store program data. One or more applications 814 perform different system operations, such as entering or updating price information, adding or deleting items to the object database, communicating with a server or other object recognition systems, uploading or downloading system configuration, and so forth.

The processor 816 executes the program instructions for the different programs, and the object and calibration database 818 stores object data (e.g., 3D models for the configured objects) and calibration data, such as calibration data obtained as described above with reference to FIG. 4. Other databases (not shown) may also be included to store other types of data, such as price lists, user accounts, credit card server information, support server information, and so forth.

It is noted that the embodiments illustrated in FIG. 8 are examples and do not describe every possible embodiment. Other embodiments may utilize additional components, combine the functionality of two more programs into a single program, have fewer components, and so forth. The embodiments illustrated in FIG. 8 should therefore not be interpreted to be exclusive or limiting, but rather illustrative.

Figure 9:
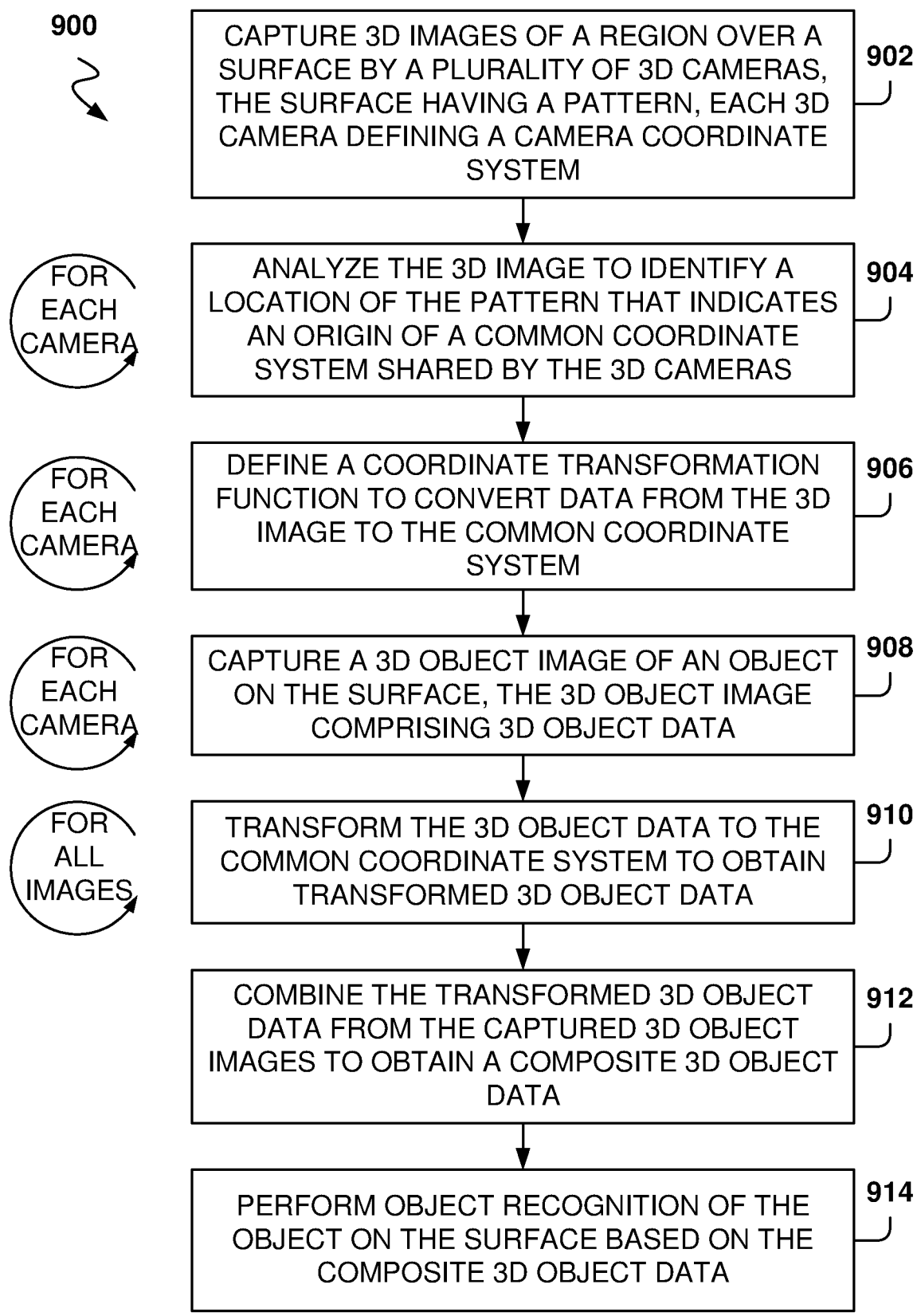
FIG. 9 is a flowchart of a method for object recognition performed by electronic devices, according to some example embodiments.

FIG. 9 is a flowchart of a method 900 for object recognition performed by electronic devices, according to some example embodiments. While the various operations in this flowchart are presented and described sequentially, one of ordinary skill will appreciate that some or all of the operations may be executed in a different order, be combined, or be executed in parallel.

At operation 902, 3D images of a region over a surface are captured by a plurality of 3D cameras. The surface has a pattern and each 3D camera from the plurality of 3D cameras defines a camera coordinate system. From operation 902, the method 900 flows to operation 904, where, for each camera, the 3D image is analyzed to identify a location of the pattern that indicates an origin of a common coordinate system shared by the 3D cameras.

From operation 904, the method 900 flows to operation 906, where, for each camera, a coordinate transformation function is defined to convert data from the 3D image to the common coordinate system. From operation 906, the method 900 flows to operation 908 for capturing, by each of the plurality of 3D cameras, a 3D object image of an object on the surface. The 3D object image comprises 3D object data.

From operation 908, the method 900 flows to operation 910, where, for the captured 3D object images, the 3D object data is transformed to the common coordinate system, resulting in transformed 3D object data. From operation 910, the method 900 flows to operation 912 for combining the transformed 3D object data from the captured 3D object images to obtain a composite 3D object data. At operation 914, the one or more processors perform object recognition of the object on the surface based on the composite 3D object data.

In some examples, the camera coordinate system includes an origin at a position of the camera, x, y, and z axes, with the z axis pointing in a direction of a view by the camera, and the common coordinate system includes a common origin on a point of the surface and a common z axis perpendicular to the surface.

In some aspect, the coordinate transformation function transforms a location of a pixel in the camera coordinate system to a location of the pixel in the common coordinate system.

In another example, combining the transformed 3D object data further includes combining pixel data from the captured 3D object images to obtain the composite 3D object data that defines pixel information and location of each pixel for the object.

In some example embodiments, combining the transformed 3D object data further includes removing pixels from a background that includes the surface.

In some examples, the pattern includes a plurality of circles arranged on a grid pattern.

In some aspects, the plurality of 3D cameras includes one or more 3D stereo cameras and one or more structured light imaging cameras.

In one example, the method 900 further includes, for each camera, defining error correction for captured images based on the captured 3D image and the location of the pattern.

In some embodiments, the object recognition is performed by a machine learning program based on the composite 3D object data.

In some embodiments, the data from the 3D image includes a plurality of pixels, with each pixel having corresponding values for x coordinate, y coordinate, z coordinate, red color value, green color value, and blue color value.

Figure 10:
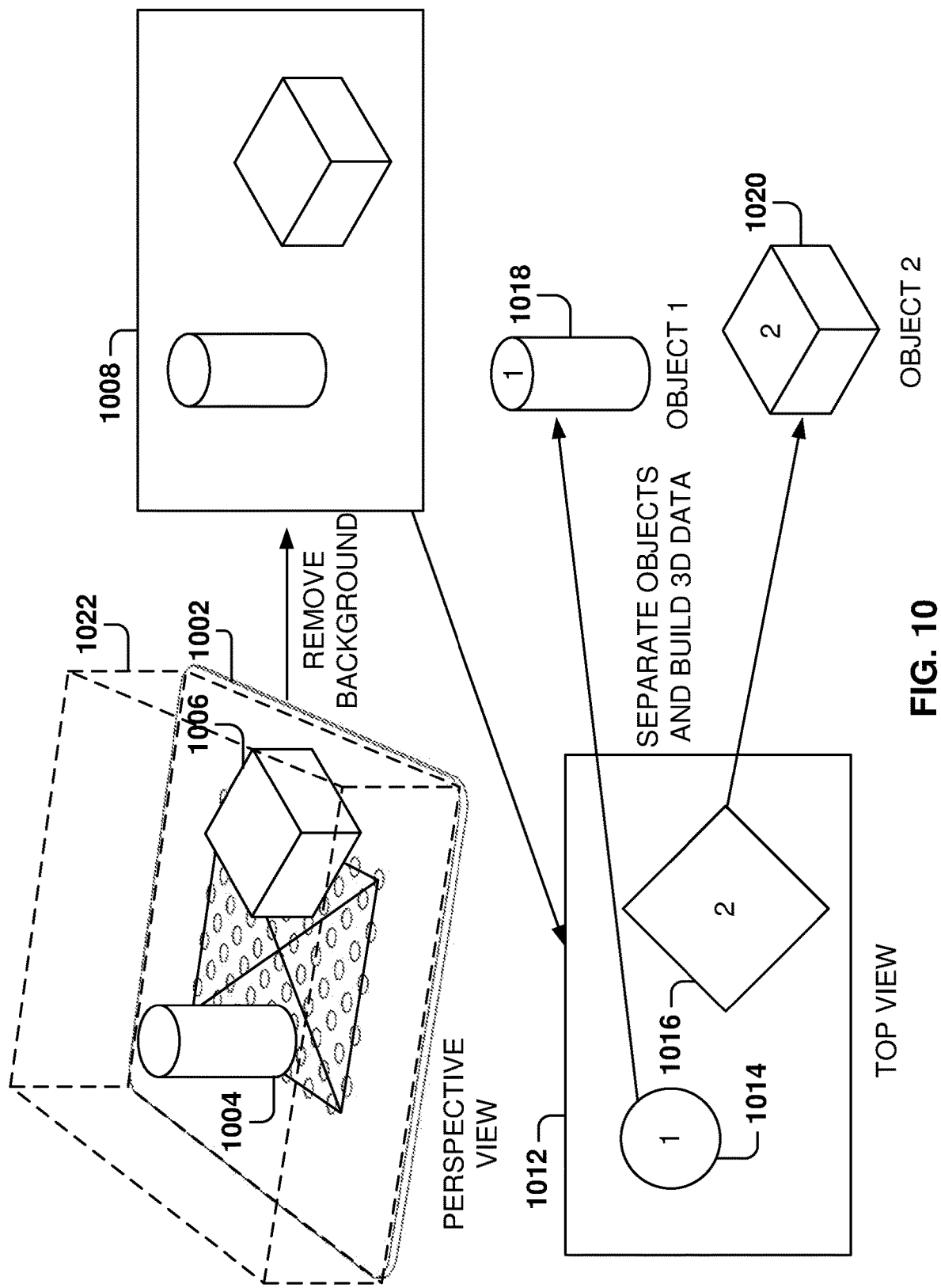
FIG. 10 illustrates object separation when the object are not connected, according to some example embodiments.

FIG. 10 illustrates object separation when the object are not connected, according to some example embodiments. FIG. 10 illustrates an example system for recognizing objects. An object-detection space 1022 defines an area where objects are placed for object recognition. The object-detection space 1022 may be of any shape and is defined by the characteristics of the system, the locations of the camera, and the like. The example shows an object-detection space 1022 in the shape of a rectangular cuboid, but other shapes may include spheres, sectional spheres, combinations of flat surfaces with curved surfaces, or any other irregular shape.

In some example embodiments, the object-detection space 1022 is immediately above tray 1002, which includes the pattern for calibrating the 3D cameras. Therefore, the tray 1002 borders the object-detection space 1022, and the object-detection space 1022 does not include the tray. In addition, the 3D cameras are also situated outside the object-detection space 1022.

In the example of FIG. 10, object 1004 and object 1006 are placed on the tray 1002 for identification. After the 3D cameras capture the images of the two objects, the image data is combined to create pixel data 1008 of the objects. Once the pixel data is obtained, the background is removed from the pixel data to obtain object pixel data. That is, the object pixel data includes the pixel data resulting from combining the 3D images from the multiple 3D cameras and from removing the background pixels.

Removing the background from the pixel data is generally a difficult operation that requires image analysis to separate surfaces from different objects. However, by using 3D data, removing the background may be performed by simply deleting pixels located outside the object-detection space 1022, which is a simple operation because the pixel data includes location information. In some example embodiments, removing the background may be performed by deleting any pixels situated below the object-detection space 1022.

In one example embodiment, the origin of the coordinate system is situated on the surface of the tray 1002 and the z dimension is perpendicular to the tray 1002, with positive z values being above the tray 1002. To remove the background, any pixel with negative z values is deleted from the image data, and pixels with a z value greater than a predefined maximum are also eliminated to discard pixels above the object-detection space. Similarly, in the rectangular cuboid object-detection space 1022 example, other pixels may be eliminated based on ranges of values for the x and y coordinates defined for the object-detection space 1022.

In some example embodiments, a separation process is performed before trying to analyze the objects to determine if there are some objects clearly separated from other objects (e.g., not touching), or separated by a small number of pixels, as compared to the relative size of the objects. In some example embodiments, the object pixel data without the background is processed by a machine-learning program to check if the object or objects on the tray may be identified. If an identification is not possible, then the system proceeds to the separation process operation in order to identify separate objects that may be processed independently for object recognition.

Further yet, in some example embodiments, the machine learning program may be able to identify combinations of objects that may appear together often. This way, the machine-learning program may detect a six-pack of soda cans without having to separate the soda cans into separate objects.

In some example embodiments, the images from each camera may be analyzed to determine if separation between objects is found by identifying connected groups of pixels. In one example embodiment, a top view 1012 of the objects is utilized, but any or all other views may be utilized for determining separation.

In the example of FIG. 10, the top view 1012 identifies two different shapes: shape 1 1014 and shape 2 1016. Because the shapes are disconnected in the top view, the objects may be separated into object 1 1018 and object 2 1020. That is, the object pixel data is broken into two sets of object pixel data: object pixel data for object 1 1018 and object pixel data for object 2 1020.

In some example embodiments, the object 1 1018 is formed by identifying the pixel data situated in the cylinder corresponding to shape 1 1014 and the object 2 1020 is formed by identifying the pixel data situated in the cylinder corresponding to shape 2 1016.

It is noted that identifying that the there is a space between the shapes is straightforward because of the 3D data available and the background pixel information has been removed. Since the background information has been removed, the separation is clearly identified because of the lack of pixels in that space. As discussed earlier, separating objects with background images is a complex problem because the computer has to recognize the difference between background and objects, which in many cases is not immediately apparent (e.g., the object and the background may have similar colors or similar shapes).

Once the object pixel data is separated, the object pixel data for each object may be processed by the machine learning program for object identification. It is noted that although some embodiments are described with reference to two objects, the principles presented herein may be utilized for more than two objects on the tray 1002. For example, if the top view 1012 identifies three different and separate shapes, the separation process will create three different object pixel data sets.

Figure 11:
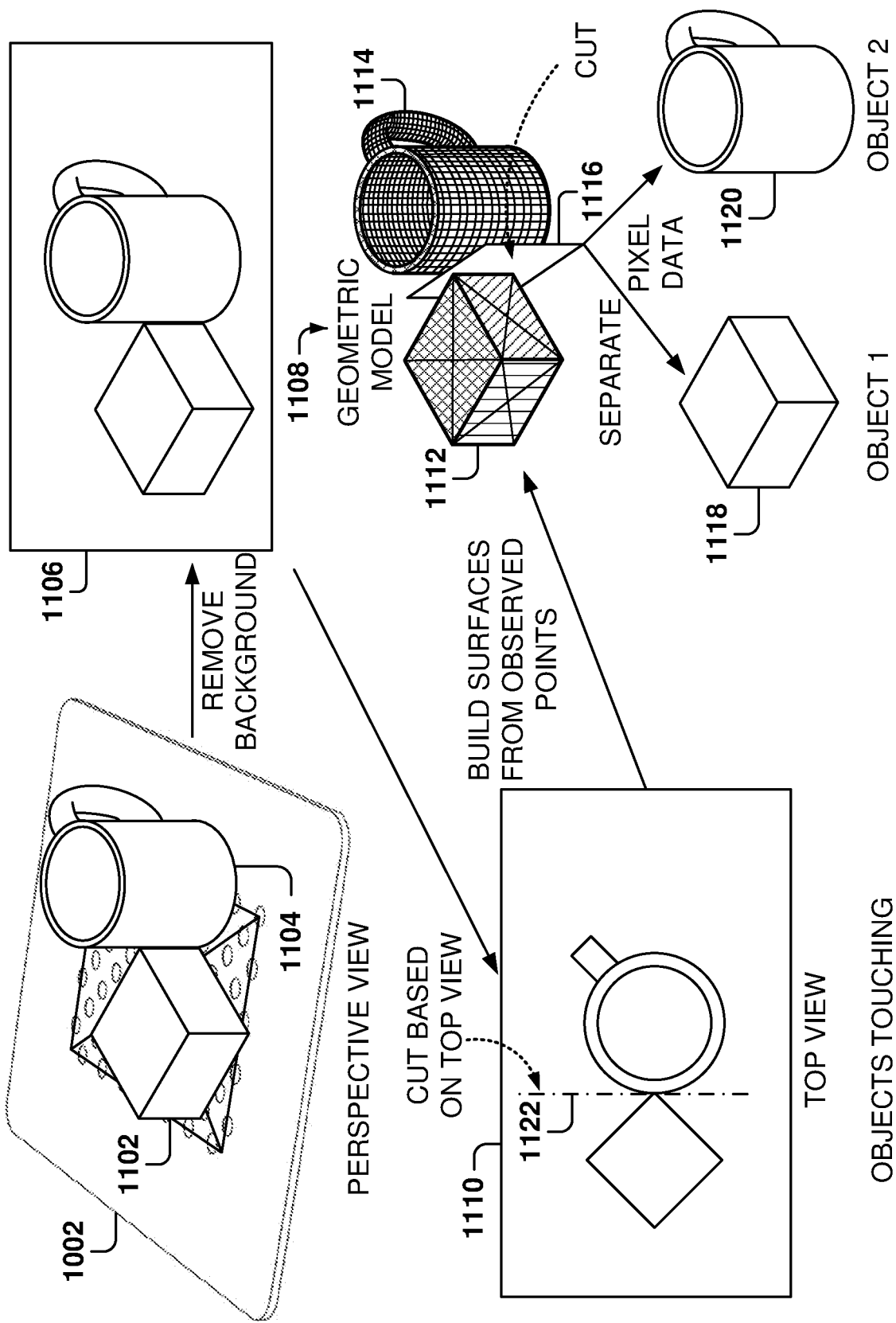
FIG. 11 illustrates separating objects when the objects are connected, according to some example embodiments.

FIG. 11 illustrates separating objects when the objects are connected, according to some example embodiments. Separating objects when the objects are connected (e.g., touching) is a complex operation because the boundaries between the objects are not immediately apparent, as is the case when the objects are disconnected. Further, some parts of the object may be occluded because another object is covering its view from the cameras, so there may not be complete 3D information for one or more of the objects. There could be some parts of the object that are hidden to all the cameras.

In some example embodiments, a first assumption is taken before starting the separation process, the assumption being that the objects are not stacked on top of each other. More details are provided below with reference to FIG. 12 regarding detection of stacked objects. Assuming that the objects are not stacked simplifies the identification task because it can be assumed that the objects are substantially compact and the pixels of the object are stacked within a certain region.

In the example of FIG. 11, a parallelogram 1102 and a mug 1104 are on tray 1002, which is below the object-detection space (omitted for clarity in FIG. 11.) As discussed above, after taking 3D images of the object-detection space and combining the image data to obtain pixel data, the background is removed leaving object pixel data 1106 for the objects on the tray 1002.

In this case, a top view 1110 indicates that the objects are touching, or to put it differently, there is only one mass of continuous pixels. Initially, it is not known if the pixel data corresponds to one, two, or even more objects.

In some example embodiments, a cut 1122 is performed in the two-dimensional space of the top view 1110 to separate the objects, and then the cut 1122 is extended downwards to create a planar cut that separates both objects.

In graph theory, a cut is a partition of the vertices of a graph into two disjoint subsets that are joined by at least one edge, and a minimum cut of a graph is a cut that is minimal in some sense. A cuts algorithm is an algorithm for generating the minimal cut of a graph. As applied in the field of computer vision, graph cuts can be employed to solve several vision recognition problems, such as image smoothing, the stereo correspondence problem, image segmentation, and other problems that can be formulated in terms of energy minimization. Such energy minimization problems can be reduced to instances of the maximum flow problem in a graph, thus enabling use of the max-flow min-cut theorem to find the minimal cut of the graph.

In some example embodiments, a graph of the pixel data is defined by creating interconnections between a pixel and its neighbors, and then the cuts algorithm is utilized to generate a cut to separate the pixel data. Although embodiments are presented herein with reference to the cuts algorithm, any image separation algorithm may be utilized, such as thresholding methods, clustering methods, compression-based methods, histogram-based methods, edge-detection methods, dual-clustering methods, region-growing methods, partial differential equation-based methods, or variational methods. Further, the cuts may be of any shape, and although embodiments are presented with reference to planar cuts, other types of cuts are also possible.

In some example embodiments, a geometric model 1108 of the pixel data is formed by creating an approximate 3D geometric figure of the pixel data, starting with the top pixels and then examining nearby pixels to create surfaces associated with the objects. As the creation of the geometric model 1108 progresses, additional surfaces keep being added until the bottom is reached. The shapes used in the geometric model may be of any kind, such as triangles, squares, spherical, any other polygon, and so forth. In addition, the shapes may be flat surfaces or may be curved surfaces. It is noted that flat shapes may be used to approximate curved surfaces (e.g., the sides of the cup) by using a combination of many small flat surfaces, but curved surfaces may also be utilized.

In some example embodiments, a convex hull is utilized for grouping sets of pixels. The convex hull, also referred to as the convex envelope of a set X of points in a Euclidean plane or in a Euclidean space, is the smallest convex set that contains X. For instance, when X is a bounded subset of the plane, the convex hull may be visualized as the shape enclosed by a rubber band stretched around X. The convex set is a subset of an affine space that is closed under convex combinations. Further, in a Euclidean space, a convex region is a region where, for every pair of points within the region, every point on the straight line segment that joins the pair of points is also within the region.

The convex hull may be defined as the intersection of all convex sets containing X or as the set of all convex combinations of points in X. With the latter definition, convex hulls may be extended from Euclidean spaces to arbitrary real vector spaces, and they may also be generalized further to oriented matroids. In some example embodiments, the convex hull provides the approximation of the object shapes.

In some example embodiments, a segmentation classifier is utilized for separating objects. In some embodiments, the segmentation classifier is a neural-network classifier that is trained on a large number of examples of touching items and the correct way to segment (e.g., separate) these touching items, although other embodiments may utilize other machine-learning programs.

A "point cloud" is a collection of points in a 3D space, where each point in the point cloud includes color information (e.g., RGB color information like a pixel) and location information (e.g., coordinates within a 3D space).

In some example embodiments, the segmentation classifier is trained in three operations, as follows:

1. A plurality of point clouds for respective plurality of real items are loaded in a database.

2. New point clouds are generated by combining random point clouds of the real items in configurations where the real items are touching.

3. The new point clouds are used to train the neural network classifier along with the answer of how to separate the point clouds of the real items into constituent point clouds.

During operation, the live point clouds are captured by the 3D cameras, and the non-touching point clouds are separated into separate groups of point clouds. Each group of point clouds is then run by the neural network classifier to determine if each group of point clouds may be further separated into point clouds of items that are touching.

If the classifier finds point clouds of items that are touching, the classifier provides information on how to separate the point clouds. Once all the point clouds have been separated, the machine learning algorithm is used to identify the real items corresponding to each separate point cloud.

Once the geometric model 1108 is created, the cuts algorithm is utilized to generate a cut 1116 to separate the geometric model into two different geometric models: geometric model 1112 for the parallelogram and geometric model 1114 for the mug. In simple terms, the cuts algorithm identifies a discontinuity, where just a narrow group of pixels is contained within the shape, so this narrow group defines the best cut because it is very likely that this cut will separate the two different objects.

Based on the cut 1116, the object pixel data may also be separated into object pixel data 1118 for the parallelogram figure and object pixel data 1120 for the mug. The geometric model, the object pixel data, or both, may then be utilized by the machine learning algorithm to identify the objects.

It is noted that the geometric model may be built from the top towards the bottom, but other approaches may also be utilized, such as going from left to right based on the view from a side camera. By using the view from each camera, combined with the 3D data, very accurate cuts may be made to separate objects. Further, the ability to easily eliminate the background greatly simplifies, and improves the accuracy of, the cuts algorithm.

Figure 12:
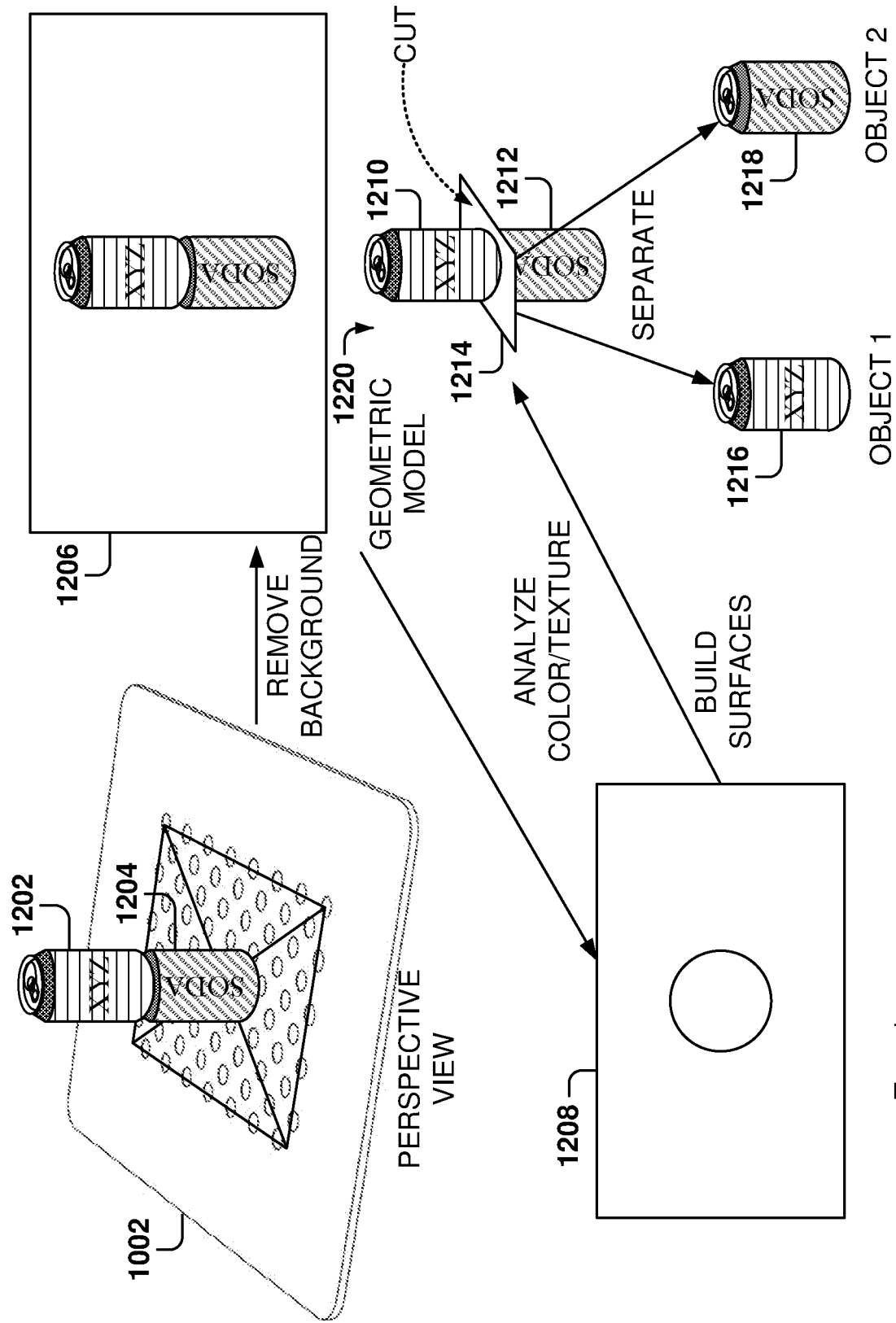
FIG. 12 illustrates separating objects when the objects are stacked, according to some example embodiments.

FIG. 12 illustrates separating objects when the objects are stacked, according to some example embodiments. Two objects, cans 1202 and 1204, are on the tray 1002. In this case, the two objects are stacked, one on top of the other, and the method described above may not work to select a cut to separate them.

In some example embodiments, color or texture information may be also utilized to separate the objects. In some example embodiments, optical character recognition (OCR) may also be utilized to identify text in the objects, and use the text as an input to the machine-learning algorithm for identifying the two objects.

As before, after taking images of the object-detection space, combining the images from the 3D cameras, and removing the background, object pixel data 1206 is obtained. Further, in this case, a top view 1208 is simply a circle and offers no clue for separating the objects.

In this example embodiment, a geometric model 1220 is built, as described above with reference to Figure ii, and then the color and texture of the surfaces in the geometric model are analyzed to generate a cut 1214. The cut 1214 separates the geometric model 1220 into a geometric model 1210 of the first can and a geometric model 1212 of the second can. From the respective geometric models, respective object pixel data 1216 and 1218 for both objects may be obtained. Therefore, to separate stacked objects, the cuts algorithm may use any combination of shapes, color, texture, and location.

Figure 13:
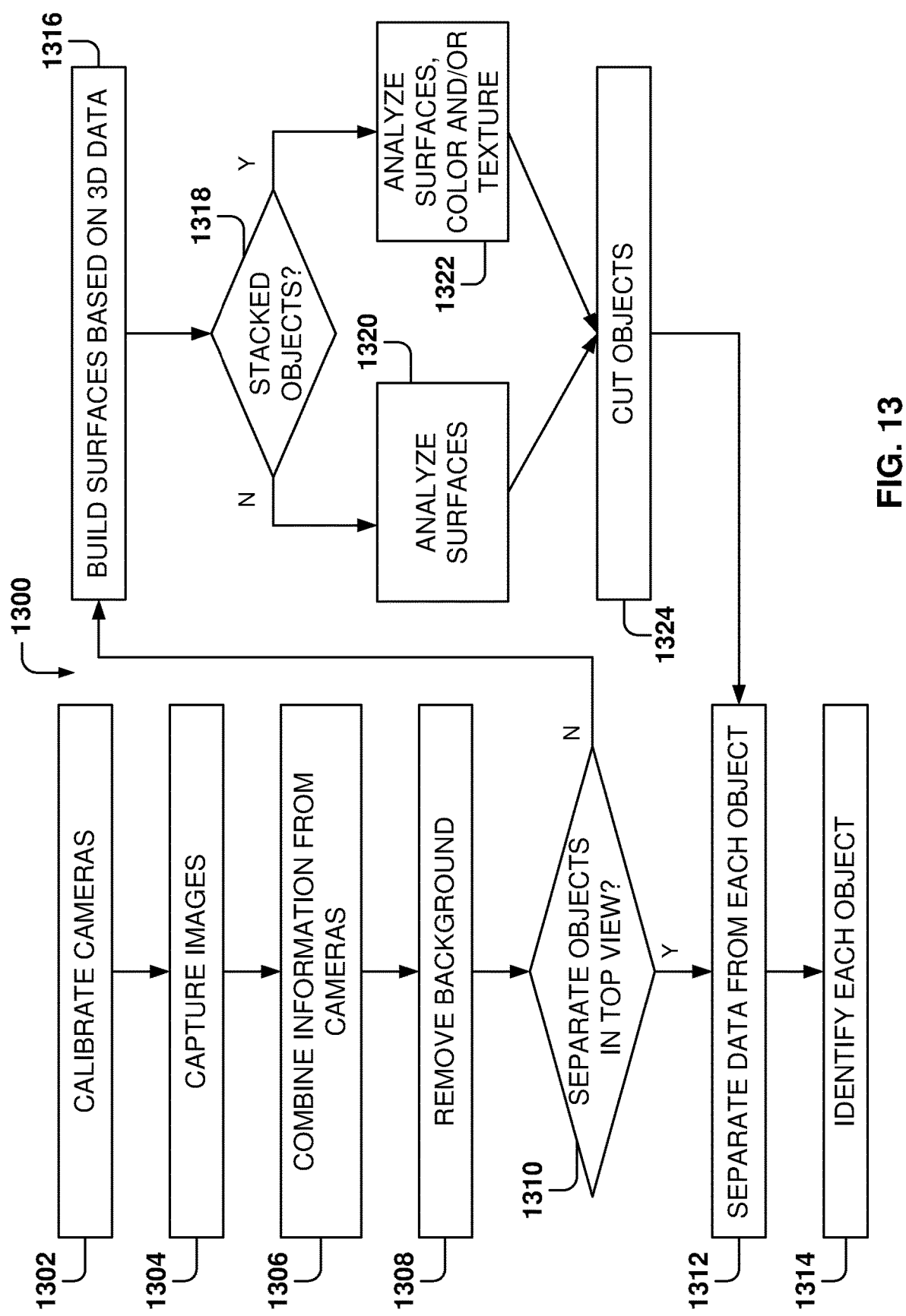
FIG. 13 is a flowchart of a method for separating objects, according to some example embodiments.

FIG. 13 is a flowchart of a method 1300 for separating objects, according to some example embodiments. While the various operations in this flowchart are presented and described sequentially, one of ordinary skill will appreciate that some or all of the operations may be executed in a different order, be combined or omitted, or be executed in parallel.

At operation 1302, the cameras are calibrated. For example, the cameras may be calibrated as discussed above with reference to FIG. 5. From operation 1302, the method flows to operation 1304, where images of the object-detection space are captured utilizing 3D cameras.

At operation 1306, the information from the cameras is combined to generate the pixel data for the objects in the object-detection space. From operation 1306, the method flows to operation 1308, where the background information is removed from the pixel data to obtain the object pixel data.

At operation 1310, a check is made to determine if separate objects may be identified from the top view. If objects are identified from the top view, the method flows to operation 1312; otherwise, the method flows to operation 1316. In other example embodiments, other views may be utilized to search for separate pixel groups (for example, a view from each of the cameras taking images of the object-detection space).

At operation 1312, the picture data from each object is separated based on the top view, and at operation 1314, a machine-learning algorithm identifies each of the objects separately by analyzing the data for each object separately.

At operation 1316, a geometric model of the pixel data is generated by building surfaces based on the object pixel data. From operation 1316, the method flows to operation 1318 where a check is made to determine if two or more objects are stacked in the object-detection space. If stacked objects are detected, the method flows to operation 1322; otherwise, the method flows to operation 1320.

At operation 1320, the surfaces in the geometric model are analyzed and at operation 1324, one or more cuts are identified for separating the objects. At operation 1322, when stacked objects are detected, the algorithm analyzes the 3D information, the surfaces and geometric model, the color, and the texture to generate the cuts at operation 1324. From operation 1324, the method flows back to operation 1312.

It is noted that the embodiments illustrated in FIG. 13 are examples and do not describe every possible embodiment. Other embodiments may utilize different separation algorithms, analyze objects that appear together often on a single pass, etc. The embodiments illustrated in FIG. 13 should therefore not be interpreted to be exclusive or limiting, but rather illustrative.

Figure 14:
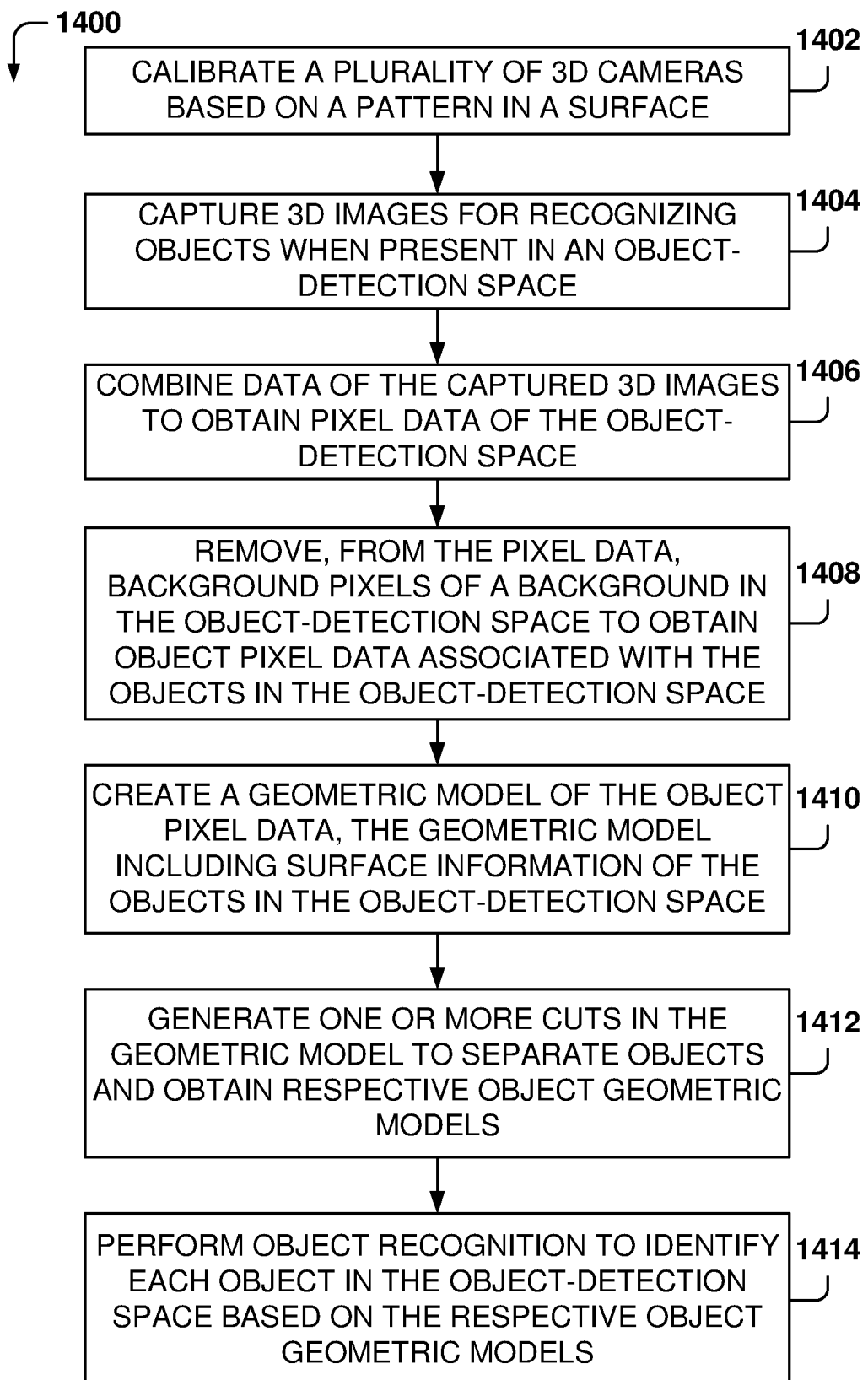
FIG. 14 is a flowchart of a method for simultaneous recognition of objects within an object-detection space utilizing three-dimensional (3D) cameras, according to some example embodiments.

FIG. 14 is a flowchart of a method 1400 for simultaneous recognition of objects within an object-detection space utilizing 3D cameras, according to some example embodiments. While the various operations in this flowchart are presented and described sequentially, one of ordinary skill will appreciate that some or all of the operations may be executed in a different order, be combined or omitted, or be executed in parallel.

At operation 1402, one or more processors calibrate a plurality of 3D cameras based on a pattern in a surface, and at operation 1404, after the calibration, the plurality of 3D cameras capture 3D images for recognizing objects when present in an object-detection space where the objects to be recognized are placed.

From operation 1404, the method flows to operation 1406, where the one or more processors combine the data captured by the 3D images to obtain pixel data of the object-detection space. At operation 1408, the one or more processors remove, from the pixel data, background pixels of a background in the object-detection space to obtain object pixel data associated with the objects in the object-detection space.

From operation 1408, the method flows to operation 1410 for creating, by the one or more processors, a geometric model of the object pixel data. The geometric model includes surface information of the objects in the object-detection space. At operation 1412, the one or more processors generate one or more cuts in the geometric model to separate objects and obtain respective object geometric models. At operation 1414, the one or more processors perform object recognition to identify each object in the object-detection space based on the respective object geometric models.

In one example, removing the background further comprises deleting, from the pixel data, pixels having a location situated outside the object-detection space.

In one example, removing the background further comprises deleting, from the pixel data, pixels having a location situated below the object-detection space.

In one example, creating the geometric model further comprises identifying one or more pixels situated on a top of the objects and then building surfaces, starting with the one or more pixels situated on a top of the objects, based on proximity of pixels to other pixels that form a surface.

In one example, the method 1400 as recited, further comprises capturing second 3D images of the object-detection space; performing object identification on pixel data of the second 3D images; reporting the identified object when object identification identifies the object; and creating the geometric model and generating one or more cuts to separate objects in the object-detection space when object identification does not identify the object.

In one example, generating the one or more cuts further comprises identifying if objects are connected in a top view of the object-detection space. Further, in one example, generating the one or more cuts further comprises, when objects are connected, identifying a cut that minimizes a separation area between objects.

In one example, combining data of the captured 3D images further comprises, for the captured 3D images, transforming the data captured by each 3D image to a common coordinate system based on the calibrating and combining the transformed data to obtain the pixel data of the object-detection space.

In one example, the object recognition is performed by a machine learning program based on the respective object geometric models.

In one example, the data from the 3D images comprises a plurality of pixels, each pixel having corresponding values for x coordinate, y coordinate, z coordinate, red color value, green color value, and blue color value.

Figure 15:
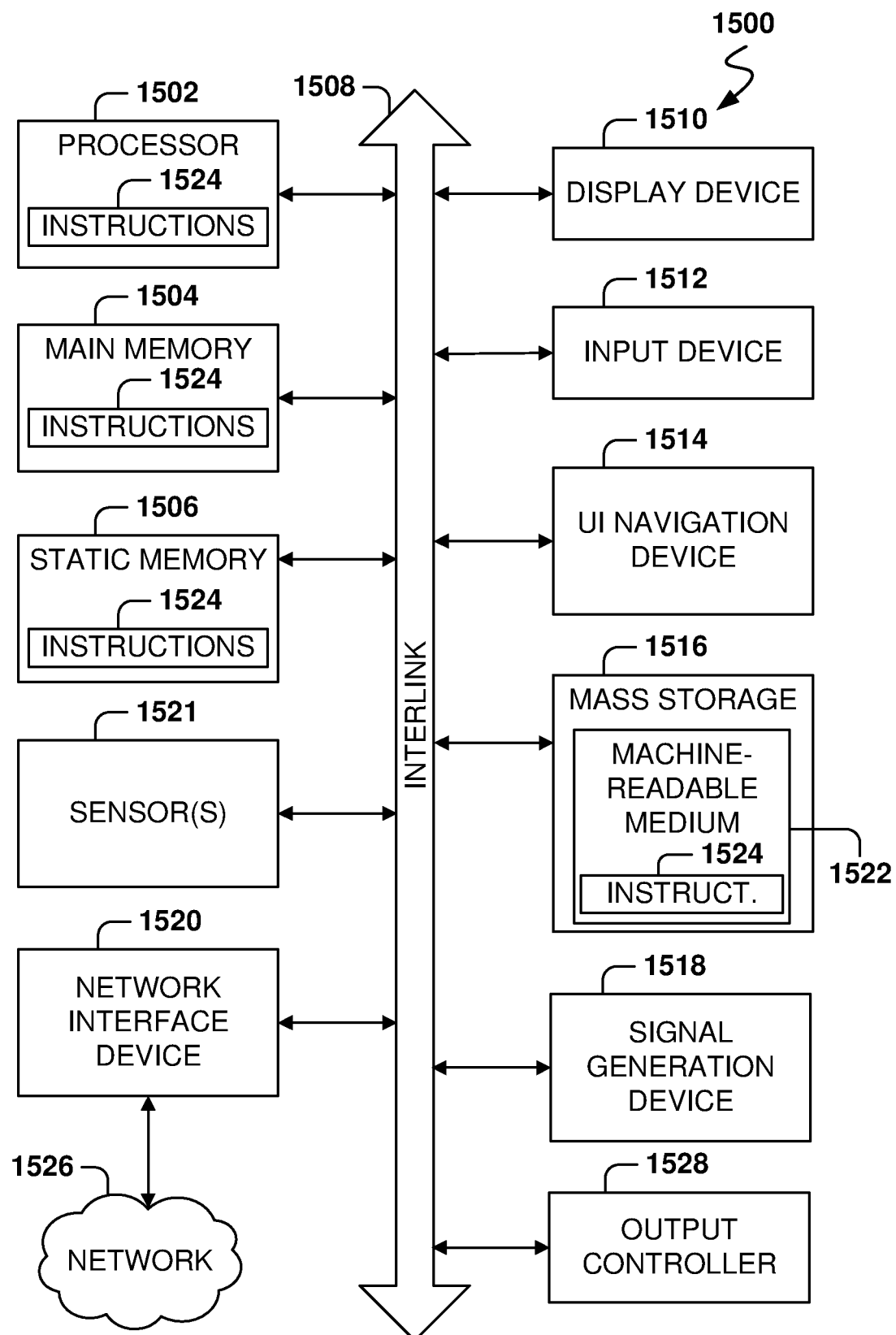
FIG. 15 is a block diagram illustrating an example of a machine upon which one or more example embodiments may be implemented.

FIG. 15 is a block diagram illustrating an example of a machine upon which one or more example embodiments may be implemented. In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine 1500 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1500 may include a hardware processor 1502 (e.g., a central processing unit (CPU), a graphics processing unit (GPU), a hardware processor core, or any combination thereof), a main memory 1504, and a static memory 1506, some or all of which may communicate with each other via an interlink (e.g., bus) 1508. The machine 1500 may further include a display device 1510, an alphanumeric input device 1512 (e.g., a keyboard), and a user interface (UI) navigation device 1514 (e.g., a mouse). In an example, the display device 1510, input device 1512, and UI navigation device 1514 may be a touch screen display. The machine 1500 may additionally include a mass storage device (e.g., drive unit) 1516, a signal generation device 1518 (e.g., a speaker), a network interface device 1520, and one or more sensors 1521, such as a global positioning system (GPS) sensor, compass, accelerometer, or other sensor. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1516 may include a machine-readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within static memory 1506, or within the hardware processor 1502 during execution thereof by the machine 1500. In an example, one or any combination of the hardware processor 1502, the main memory 1504, the static memory 1506, or the storage device 1516 may constitute machine-readable media.

While the machine-readable medium 1522 is illustrated as a single medium, the term "machine-readable medium" may include a single medium or multiple media (e.g., a centralized or distributed database, and/or associated caches and servers) configured to store the one or more instructions 1524.

The term "machine-readable medium" may include any medium that is capable of storing, encoding, or carrying instructions 1524 for execution by the machine 1500 and that cause the machine 1500 to perform any one or more of the techniques of the present disclosure, or that is capable of storing, encoding or carrying data structures used by or associated with such instructions 1524. Non-limiting machine-readable medium examples may include solid-state memories, and optical and magnetic media. In an example, a massed machine-readable medium comprises a machine-readable medium 1522 with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1524 may further be transmitted or received over a communications network 1526 using a transmission medium via the network interface device 1520 utilizing any one of a number of transfer protocols (e.g., frame relay, IP, TCP, user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, P2P networks, among others. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 1524 for execution by the machine 1500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for object identification comprising:
   a set of images depicting a set of objects within an object-detection space;
   determining a geometric model associated with the set of objects based on the set of images;
   generating a set of cuts in the geometric model, comprising:
      determining a set of two-dimensional (2D) cuts within a 2D view of the geometric model;
      determining a set of three-dimensional (3D) cuts by extending each 2D cut of the set through the geometric model; and
      determining object geometric models for each object within the set of objects based on the set of 3D cuts; and
   identifying the objects within the set based on the respective object geometric models.

2. The method of claim 1, wherein determining the geometric model comprises:
   detecting a base of the object-detection space within each image based on a pattern attached to the base;
   identifying object pixel data associated with locations above the base based on the set of images; and
   generating the geometric model based on the object pixel data.

3. The method of claim 1, wherein determining the geometric model comprises building the geometric model from a top of an object to a bottom of the object.

4. The method of claim 1, wherein the 2D view comprises a top-down view.

5. The method of claim 4, wherein the top-down view is associated with a top-down image from the set of images, wherein the 2D cut is generated based on the top-down image.

6. The method of claim 1, wherein generating the set of cuts further comprises:
   determining a set of connected objects within the set of objects in the 2D view of the geometric model; and
   determining the set of 2D cuts between the set of connected objects, wherein the set of 2D cuts minimizes one or more separation areas between connected objects of the set.

7. The method of claim 1, wherein determining the set of 2D cuts comprises identifying a discontinuity within the geometric model.

8. The method of claim 1, wherein the set of objects are identified using an object classifier.

9. The method of claim 8, wherein the object classifier identifies text.

10. A system for object identification comprising:
    a set of cameras, configured to capture a set of images of a set of objects within an object-detection space;
    a processing system, configured to:
       determine a geometric model associated with the set of objects based on the set of images;
       generate a set of cuts in the geometric model, comprising:
          determining a set of two-dimensional (2D) cuts within a 2D view of the geometric model;
          determining a set of three-dimensional (3D) cuts by extending each 2D cut of the set through the geometric model;
          determining object geometric models for each object within the set of objects based on the set of 3D cuts; and
       identify the set of objects based on the respective object geometric models.

11. The system of claim 10, wherein the 2D view comprises a top-down view.

12. The system of claim 11, wherein the top-down view is associated with a top-down image from the set of images, wherein the 2D cut is generated based on the top-down image.

13. The system of claim 11, wherein generating the set of cuts further comprises:
    determining a set of connected objects within the set of objects in the top-down view of the geometric model; and
    determining the set of 2D cuts between the set of connected objects, wherein the set of 2D cuts minimizes one or more separation areas between connected objects of the set.

14. The system of claim 10, wherein the set of 2D cuts is determined using a segmentation classifier.

15. The system of claim 14, wherein the segmentation classifier comprises a neural network.

16. The system of claim 10, wherein determining the set of 2D cuts comprises identifying a discontinuity within the geometric model.

17. The system of claim 10, wherein the set of objects are identified by a machine learning model, based on the respective object geometric models.

18. The system of claim 17, wherein the machine learning model comprises an object classifier.

19. The system further comprising generating an invoice based on the identified set of objects.

20. The system of claim 10, wherein the set of cameras are positioned at different views.

* * * * *